United States Patent [19]
Mukai et al.

[11] Patent Number: 5,978,145
[45] Date of Patent: Nov. 2, 1999

[54] VIEWFINDER OPTICAL SYSTEM

[75] Inventors: Hiromu Mukai; Shigeto Ohmori, both of Kawachinagano, Japan

[73] Assignee: Minolta Co., Ltd., Osaka, Japan

[21] Appl. No.: 08/840,792

[22] Filed: Apr. 16, 1997

[30] Foreign Application Priority Data

| Apr. 16, 1996 | [JP] | Japan | 8-094134 |
| Apr. 16, 1996 | [JP] | Japan | 8-094138 |
| Sep. 9, 1996 | [JP] | Japan | 8-237560 |

[51] Int. Cl.⁶ ............ G02B 3/00; G02B 25/00; G02B 13/02
[52] U.S. Cl. ............ 359/642; 359/643; 359/644; 359/645; 396/373; 396/374; 396/375
[58] Field of Search ............ 359/642–797; 396/373–386

[56] References Cited

U.S. PATENT DOCUMENTS

| 5,044,706 | 9/1991 | Chen | 359/357 |
| 5,148,314 | 9/1992 | Chen | 359/642 |
| 5,446,588 | 8/1995 | Missig et al. | 359/565 |
| 5,715,090 | 2/1998 | Meyers | 359/565 |

*Primary Examiner*—Georgia Epps
*Assistant Examiner*—Michael A Lucas
*Attorney, Agent, or Firm*—Sidley & Austin

[57] ABSTRACT

A viewfinder optical system has a relay lens system and an eyepiece optical system. The relay lens system refocuses a primary image as a secondary image. The relay lens system consists of a single lens element which has a surface having optical power of diffraction. The eyepiece optical system magnifies the secondary image and has a surface having optical power of diffraction.

31 Claims, 18 Drawing Sheets

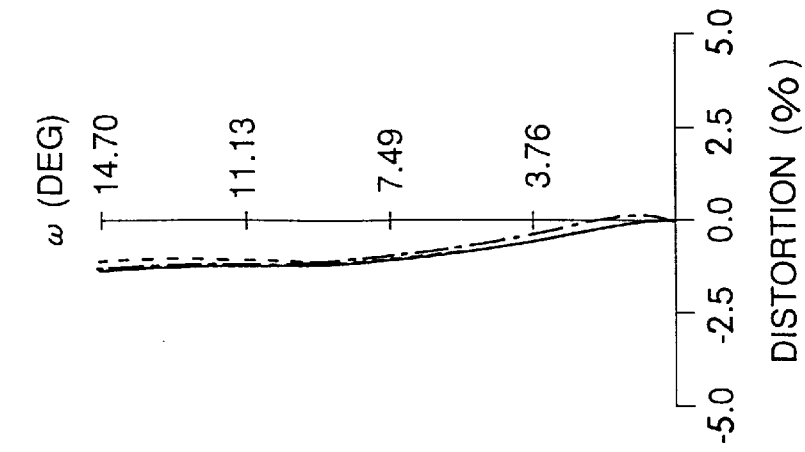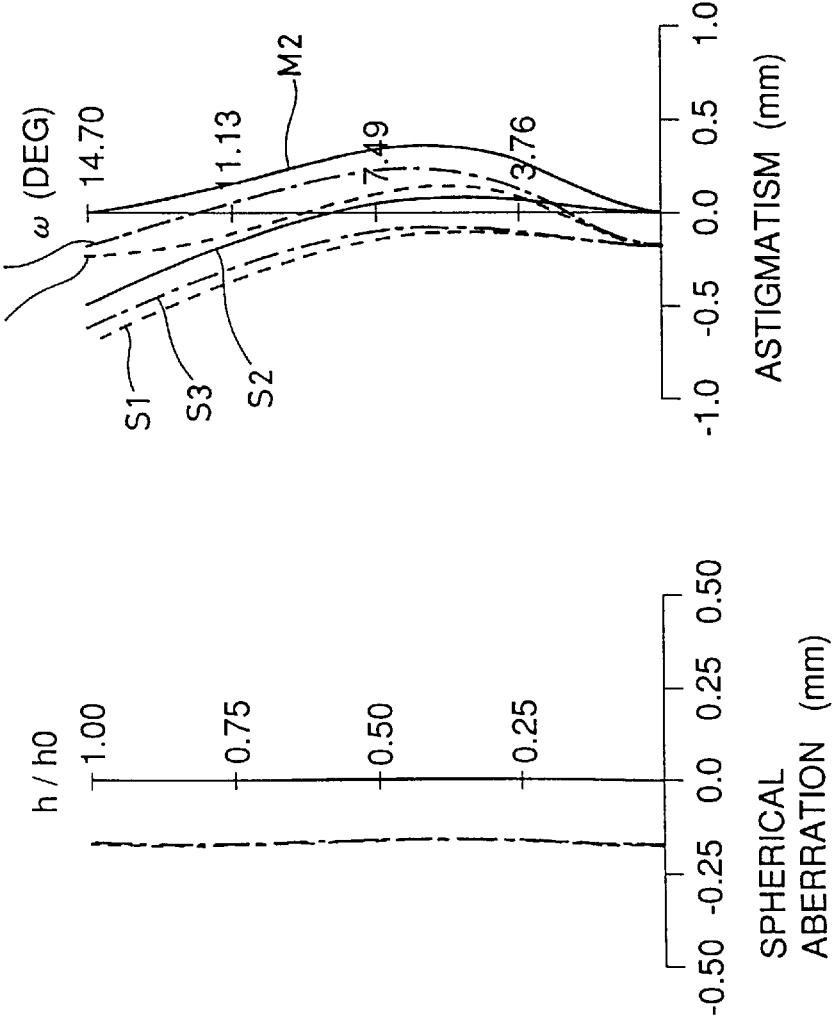

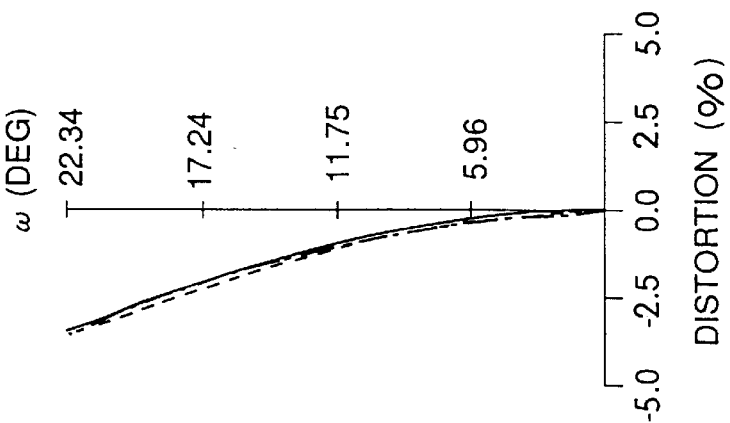
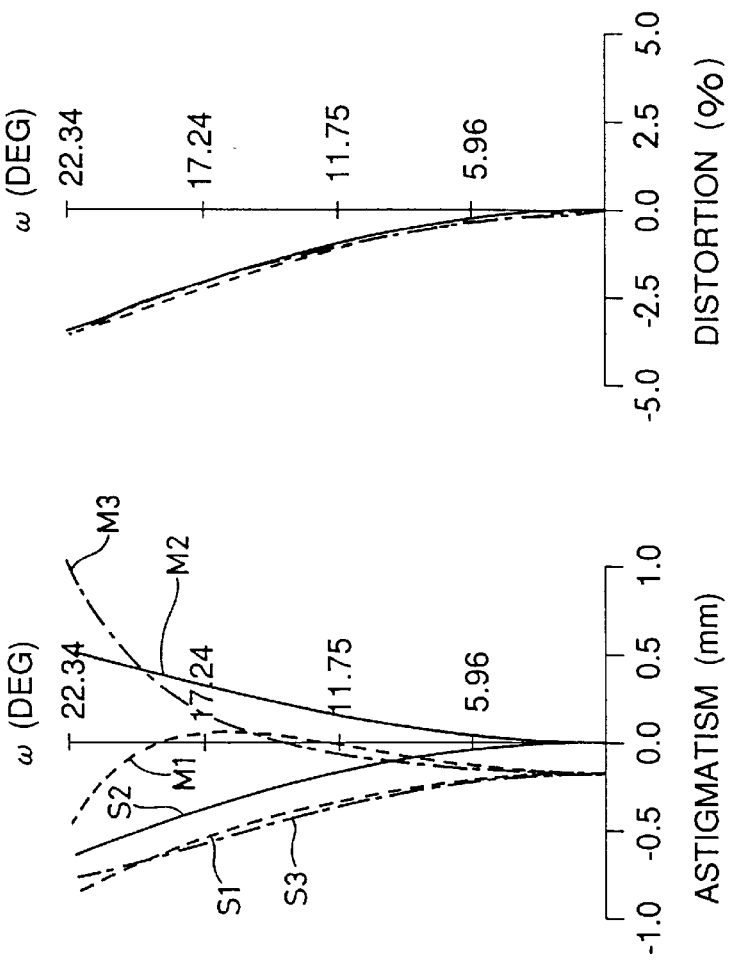
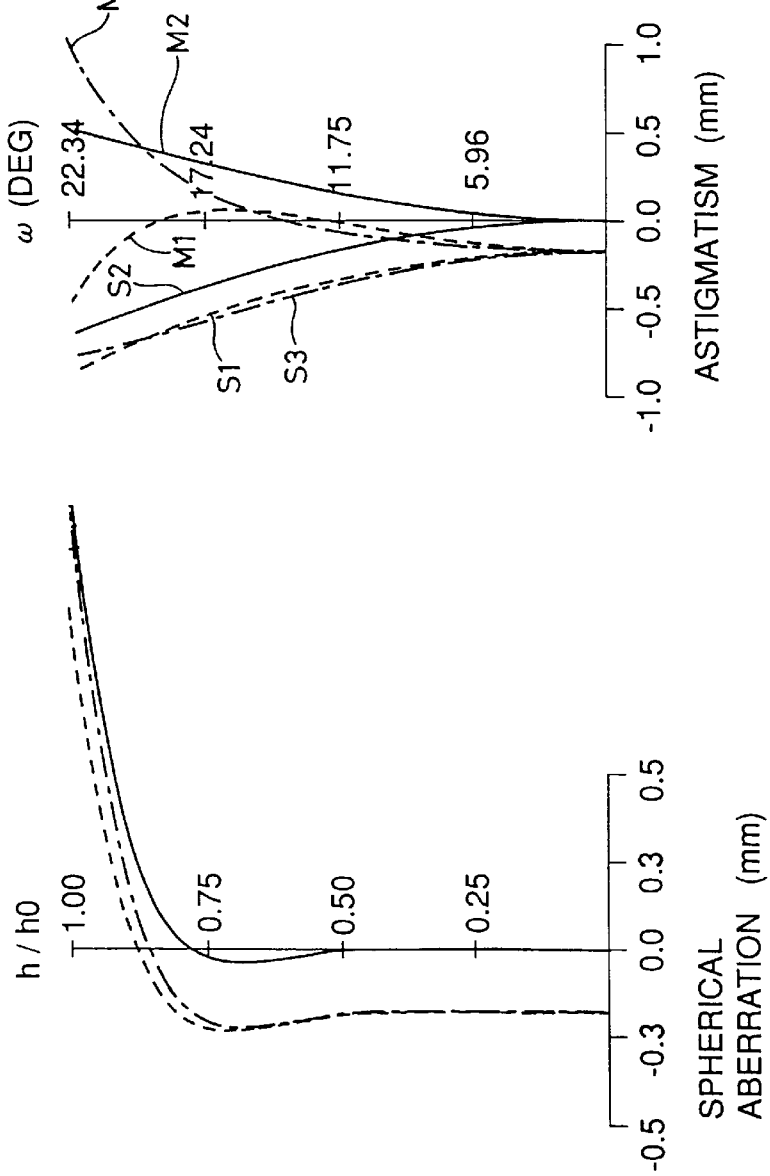

[W]

[T]

VIEWFINDER OPTICAL SYSTEM

BACKGROUND OF THE INVENTION

1. Field of the Invention

The present invention relates to a viewfinder optical system for a camera.

2. Description of the Prior Art

In general, single-lens-reflex cameras utilize relay-type viewfinder optical systems. Conventional relay-type viewfinder optical systems are composed of a number of lenses, and this has prevented the reduction of the weight, size, and cost of such viewfinder optical systems. These inconveniences can be overcome by reducing the number of constituent lens elements.

However, the reduction of the number of lens elements and the use of plastic lenses make it more difficult to correct aberration satisfactorily. In particular, chromatic aberration, which can be corrected only with a combination of lenses made of materials having different dispersion, is difficult to correct with a reduced number of lens elements or with plastic lenses. In addition, since there are only few kinds of plastic that can be used satisfactorily as lenses, it is not possible to freely select plastic materials having different dispersions for the correction of chromatic aberration. Accordingly, it is difficult to use plastic lenses for all the lens elements constituting an optical system.

On the other hand, lens-shutter cameras and digital cameras employ Kepler-type real-image viewfinder optical systems. Some conventionally known Kepler-type real-image viewfinder optical systems include an objective lens and an eyepiece lens, and correct chromatic aberration by the use of a diffracting optical surface. For example, U.S. Pat. No. 5,044,706 proposes a viewfinder optical system in which a binary diffraction grating is provided only in the objective lens, and U.S. Pat. No. 5,446,588 proposes a viewfinder optical system in which a diffracting optical element is provided only in the eyepiece lens.

The optical performance of a Kepler-type real-image viewfinder optical system is evaluated by evaluating its total optical performance including that of the objective lens and that of the eyepiece lens. Accordingly, for example, the axial chromatic aberration occurring in the objective lens is added together with that occurring in the eyepiece lens for evaluation. In addition, when the objective lens is a zoom lens system, the objective lens needs to be designed such that chromatic aberration is properly corrected over the entire zoom range.

In the viewfinder optical system proposed in U.S. Pat. No. 5,044,706, since a diffracting optical surface is provided only in the objective lens, the chromatic aberration occurring in the eyepiece lens needs to be corrected by the use of negative lenses in the eyepiece lens. Accordingly, this viewfinder optical system inevitably requires more lens elements because of the extra negative lens elements used in combination.

On the other hand, in the viewfinder optical system proposed in U.S. Pat. No. 5,446,588, a diffracting optical surface is provided only in the eyepiece lens, and the optical performance of the optical system is evaluated by evaluating only the optical performance of the eyepiece lens. Accordingly, to achieve proper correction of chromatic aberration over the entire system, this viewfinder optical system needs to be provided with additional negative lenses for correcting the chromatic aberration occurring in the objective lens. This inevitably increases the number of lens elements.

SUMMARY OF THE INVENTION

An object of the present invention is to provide a viewfinder optical system that can correct chromatic aberration properly with a reduced number of lens elements.

Another object of the present invention is to provide a viewfinder optical system that can correct chromatic aberration properly with a reduced number of lens elements and with plastic lenses alone.

Still another object of the present invention is to provide a Kepler-type real-image viewfinder optical system that can correct chromatic aberration properly with a reduced number of lens elements.

A further object of the present invention is to provide a Kepler-type real-image viewfinder optical system having a zoom function in which chromatic aberration is properly corrected over the entire zoom range with a reduced number of lens elements.

To achieve the above objects, according to one aspect of the present invention, a viewfinder optical system is constituted of a relay lens system for refocusing a primary image as a secondary image and including at least one surface having optical power of diffraction; and an eyepiece optical system for magnifying the secondary image and including at least one surface having optical power of diffraction.

According to another aspect of the present invention, a Kepler-type viewfinder optical system is constituted of an objective lens system for focusing rays from an object as an intermediate image and including at least one surface having optical power of diffraction; and an eyepiece optical system for magnifying the intermediate image and including at least one surface having optical power of diffraction.

According to still another aspect of the present invention, in a viewfinder optical system consisting of a plurality of lenses whose material is plastic, at least one of the lenses includes at least one surface having optical power of diffraction.

BRIEF DESCRIPTION OF THE DRAWINGS

This and other objects and features of this invention will become clear from the following description, taken in conjunction with the preferred embodiments with reference to the accompanied drawings in which:

FIGS. 4A to 4C are aberration diagrams showing the aberration observed in the first embodiment;

FIGS. 8A to 8C are aberration diagrams showing the aberration observed in the third embodiment;

DESCRIPTION OF THE PREFERRED EMBODIMENTS

Figure 1:
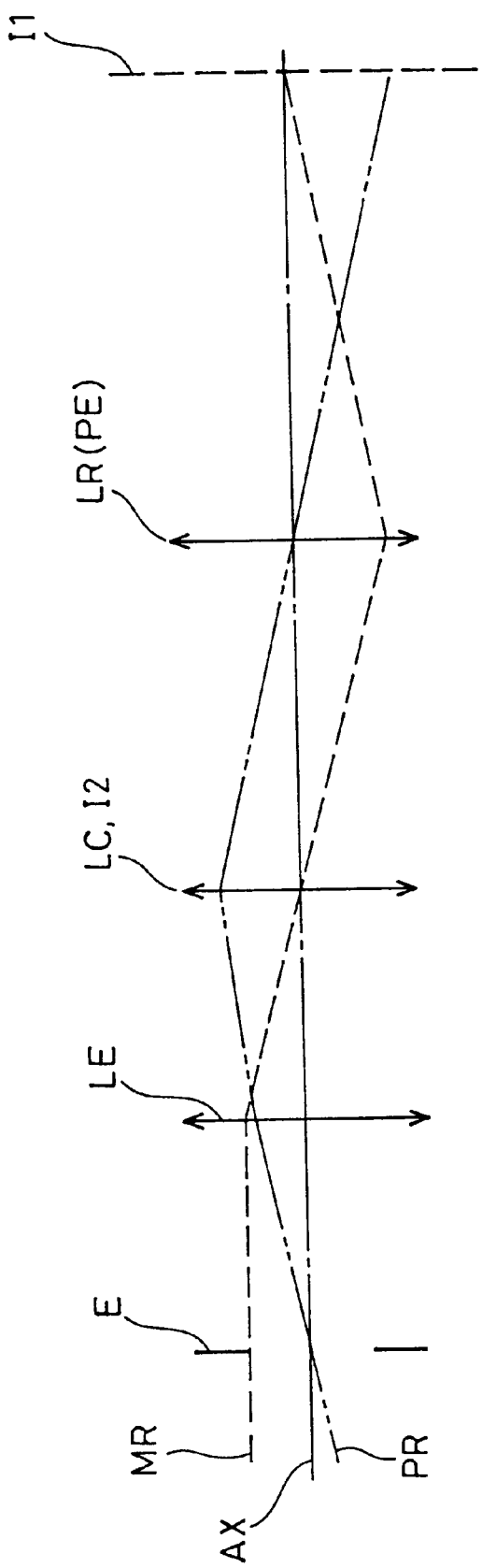
FIG. 1 is a diagram schematically showing the paraxial power arrangement and optical paths of a typical relay viewfinder optical system.

Hereinafter, embodiments of the viewfinder optical system according to the present invention will be described with reference to the drawings.

FIGS. 3, 5, 7, and 9 show the lens construction and optical paths (the order of diffraction on diffracting optical surfaces: +1) of the viewfinder optical systems of a first to a fourth embodiment, respectively, of the present invention. In FIGS. 3, 5, 7, and 9, Si (i=0, 1, 2, 3, . . . ) represents the i-th surface from the primary image I1 plane (S0), Gi (i=1, 2, 3) represents the i-th lens element from the primary image I1. A surface Si marked with an asterisk (*) is an aspherical surface, and a surface Si marked with [DOE] is a surface where a diffracting optical surface is formed on a refracting optical surface.

The primary image I1 is a focal plane of a taking lens (not shown). The viewfinder optical systems of the first, second, and fourth embodiments are each constituted of, from the primary image I1 side, a relay lens LR, a condenser lens LC, and an eyepiece lens LE, each lens being composed of a single lens element. The viewfinder optical system of the third embodiment is constituted of, from the primary image I1 side, two relay lenses LR, and an eyepiece lens LE. Each of the first to fourth embodiments is composed exclusively of plastic lenses having positive power, and includes a minimal number (three in total) of lenses.

The relay lens LR forms a secondary image I2 by refocusing the primary image I1. The condenser lens LC condenses the light beam exiting from the relay lens LR and directs it to the eyepiece lens LE. The eyepiece lens LE magnifies the secondary image I2 formed by the relay lens LR. The thus magnified image I2 is observed by an observer's eye E.

In the first embodiment, the relay lens LR is composed of a plano-convex lens element G1 (having aspherical surfaces on its both surfaces S1 and S2, and having a diffracting optical surface on its image I1 side surface S1) with its convex surface facing toward the pupil E side. The condenser lens LC is composed of a positive biconvex lens element G2 (having an aspherical surface on its image I1 side surface S3). The eyepiece lens LE is composed of a positive biconvex lens element G3 (having a diffracting optical surface formed on an aspherical surface on its image I1 side surface S5). All the three lens elements G1 to G3 are plastic lenses made of PMMA (polymethyl methacrylate).

In the second embodiment, the relay lens LR is composed of a plano-convex lens element G1 (having aspherical surfaces on its both surfaces S1 and S2, and having a diffracting optical surface on its pupil E side surface S2) with its convex surface facing toward the pupil E side. The condenser lens LC is composed of a positive meniscus lens element G2 (having a diffracting optical surface formed on an aspherical surface on its image I1 side surface S3) with its convex surface facing toward the pupil E side. The eyepiece lens LE is composed of a positive biconvex lens element G3 (having an aspherical surface on its pupil E side surface S6). All the three lens elements G1 to G3 are plastic lenses made of PMMA.

In the third embodiment, the relay lens LR is composed of a negative meniscus lens element G1 (having an aspherical surface on its image I1 side surface S1) with its concave surface facing toward the image I1 side, and a positive biconvex lens element G2 (having aspherical surfaces on its both surfaces S3 and S4, and having a diffracting optical surface on its pupil E side surface S4). The eyepiece lens LE is composed of a positive biconvex lens element G3 (having aspherical surfaces on its both surfaces S5 and S6, and having a diffracting optical surface on its pupil E side surface S6). All the three lens elements G1 to G3 are plastic lenses made of PMMA.

In the fourth embodiment, the relay lens LR is composed of a positive meniscus lens element G1 (having aspherical surfaces on its both surfaces S1 and S2, and having a diffracting optical surface on its image I1 side surface S1) with its convex surface facing toward the pupil E side. The condenser lens LC is composed of a positive biconvex lens element G2 (having an aspherical surface on its image I1 side surface S3). The eyepiece lens LE is composed of a positive biconvex lens element G3 (having a diffracting optical surface formed on an aspherical surface on its image I1 side surface S5). The first lens element G1 is a plastic lens made of amorphous polyolefin-based resin, and the second and third lens elements G2 and G3 are plastic lenses made of PMMA.

The viewfinder optical systems of the first to fourth embodiments are all characterized in that at least one diffracting optical surface having positive power is provided between the position PE conjugate to the pupil E and the secondary image I2, and also between the secondary image I2 and the pupil E. Specifically, in the first, third, and fourth embodiments, a diffracting optical surface having positive power is provided in each of the relay lens LR and the eyepiece lens LE, and, in the second embodiment, a diffracting optical surface having positive power is provided in each of the relay lens LR and the condenser lens LC. Moreover, the viewfinder optical systems of the first to fourth embodiments are characterized also in that they are composed exclusively of plastic lenses. That is, all of the first to fourth embodiments are provided with diffracting optical elements made of plastic (diffracting/refracting hybrid lenses made of plastic) in which a diffracting optical surface is formed on a refracting optical surface. A description will be given below as to how the diffracting optical surfaces are arranged.

FIG. 1 shows the paraxial power arrangement of a typical relay viewfinder optical system. In this figure, the primary image I1 (corresponding, here, to the object plane) and the pupil E are illustrated in reversed positions in order to make it easier to follow the paths of light-rays (an ideal marginal ray MR and an ideal principal ray PR). The pupil E corresponds to the position of an observer's eye, and is usually substantially conjugate to the relay lens LR. The condenser lens LC is disposed in the vicinity of the focal point of the eyepiece lens LE, and serves to focus the pupil E on the position of the relay lens LR.

There are two types of chromatic aberration: axial chromatic aberration and lateral chromatic aberration. Assume that the coefficient of axial chromatic aberration is L, the coefficient of lateral chromatic aberration is T, the eyepiece lens LE is a first lens, the condenser lens LC is a second lens, and the relay lens LR is a third lens. Then, the total of each type of chromatic aberration occurring on the refracting optical surfaces of the i-th lens (here, i=1, 2, or 3) is expressed by formulae (A) and (B) below:

$$L = \sum_i \{hi^2(\phi i/vi)\} \quad \text{(A)}$$

$$T = \sum_i \{hi \cdot hi\#(\phi i/vi)\} \quad \text{(B)}$$

where

φi: the power of the refracting optical surfaces of the i-th lens;

vi: the Abbe number of the refracting optical surfaces of the i-th lens;

hi: the height at which the ideal marginal ray MR crosses the i-th lens;

hi#: the height at which the ideal principal ray PR crosses the i-th lens.

Both the power φi and the Abbe number vi of the refracting optical surfaces of the i-th lens are positive (φi>0, vi>0). The height hi at which the ideal marginal ray MR crosses the i-th lens and the height hi# at which the ideal principal ray PR crosses the i-th lens change their sign as shown in Table 1.

As for axial chromatic aberration, since both $hi^2$ and φi/vi of both the eyepiece lens LE and the relay lens LR are positive ($h1^2$, $h3^2$>0; φ1/v1, φ3/v3>0), the axial chromatic aberration occurring in the eyepiece lens LE and that occurring in the relay lens LR are added together. On the other hand, since h2 of the condenser lens LC is zero, the refracting optical surfaces of the condenser lens LC do not affect the coefficient L of axial chromatic aberration. Accordingly, the coefficient L of axial chromatic aberration is always positive (L>0). This indicates that axial chromatic aberration cannot be corrected with a combination of single convex lenses alone. As for lateral chromatic aberration, since h2 of the condenser lens LC and h3# of the relay lens LR are both zero (h2=h3#=0), lateral chromatic aberration occurs only in the eyepiece lens LE, to the degree represented by the term h1·h1#(φ1/v1).

When the relay viewfinder optical system includes diffracting optical surfaces, the axial chromatic aberration and lateral chromatic aberration occurring on the diffracting optical surface of the i-th lens are respectively added to those expressed by formulae (A) and (B). Accordingly, the total of each type of chromatic aberration occurring on the refracting and diffracting optical surfaces constituting the relay viewfinder optical system are expressed by formulae (C) and (D) below:

$$L = \sum_i \left[hi^2\left\{\left(\frac{\phi i}{vi}\right)+\left(\frac{\phi i'}{vi'}\right)\right\}\right] \quad \text{(C)}$$

$$T = \sum_i \left[hi^2 \cdot hi\#\left\{\left(\frac{\phi i}{vi}\right)+\left(\frac{\phi i'}{vi'}\right)\right\}\right] \quad \text{(D)}$$

where

φi': the power of the diffracting optical surface of the i-th lens;

vi': the Abbe number of the diffracting optical surface of the i-th lens.

The Abbe number v' of a diffracting optical surface is defined by formula (E) below. From formula (E), it is understood that a diffracting optical surface has a remarkably large negative dispersion (i.e. a remarkably small Abbe number) of v'=−3.45.

$$v'=\lambda d/(\lambda F-\lambda C) \quad \text{(E)}$$

where

λd: the wavelength of d-lines (=588 nm);

λF: the wavelength of F-lines (=486 nm);

λC: the wavelength of C-lines (=656 nm).

Figure 2:
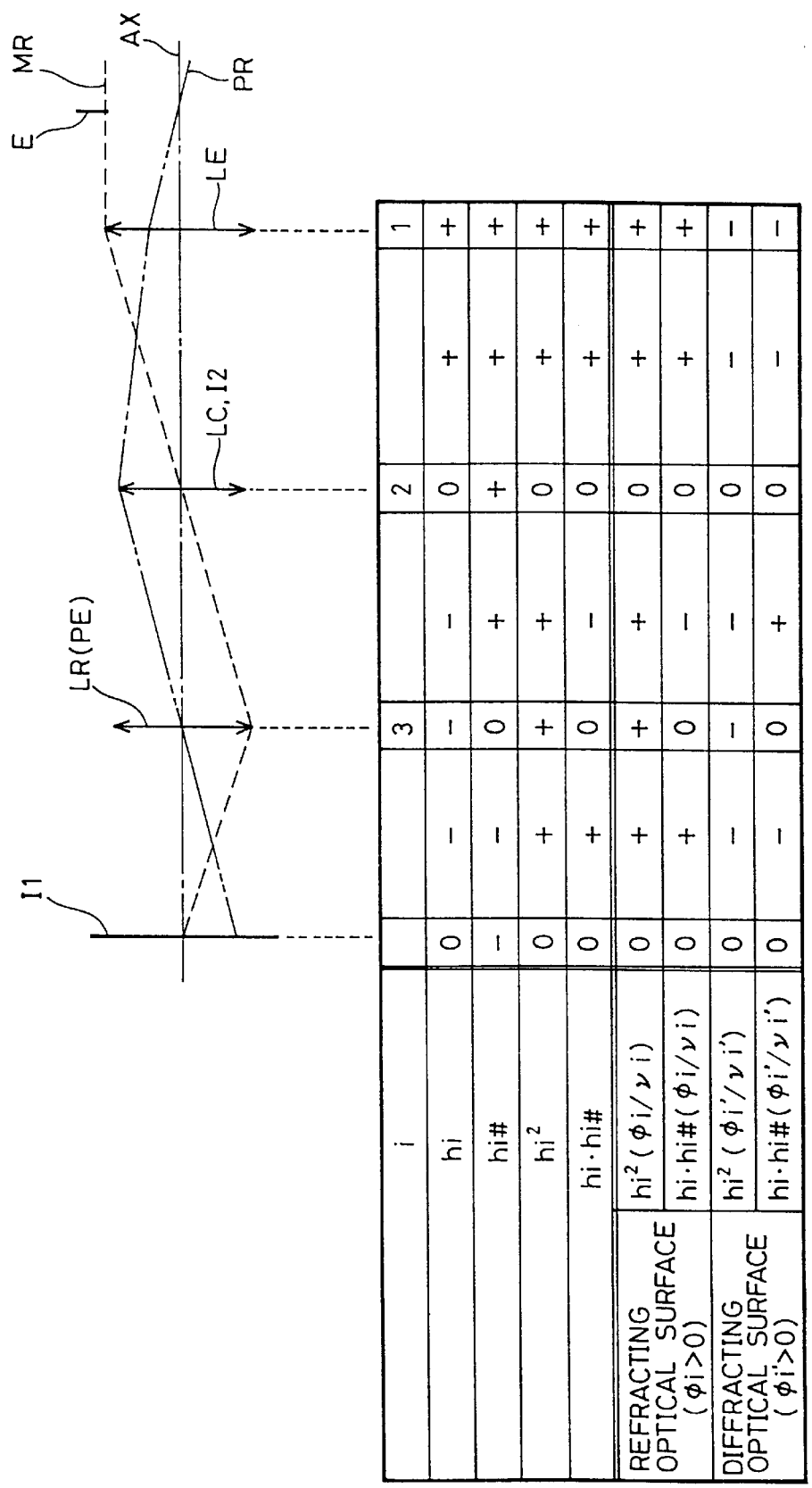
FIG. 2 is a diagram showing the relationship between the height of a light-ray and chromatic aberration at some particular points in the relay viewfinder optical system of FIG. 1.
Figure 3:
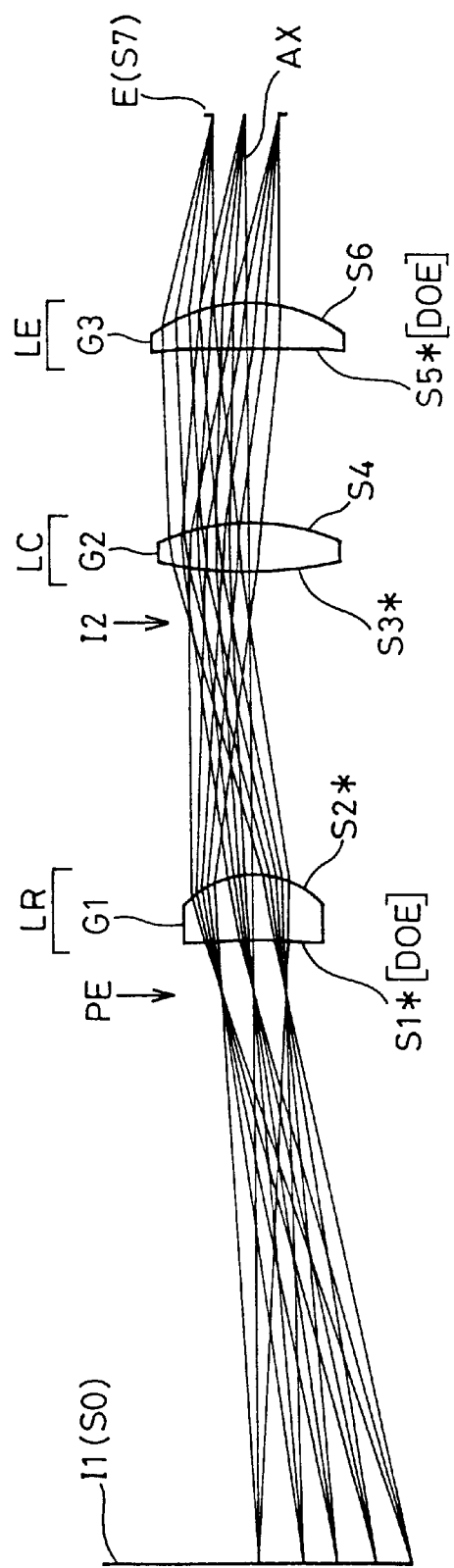
FIG. 3 is a diagram showing the lens construction and optical paths of a first embodiment of the present invention.
Figure 5:
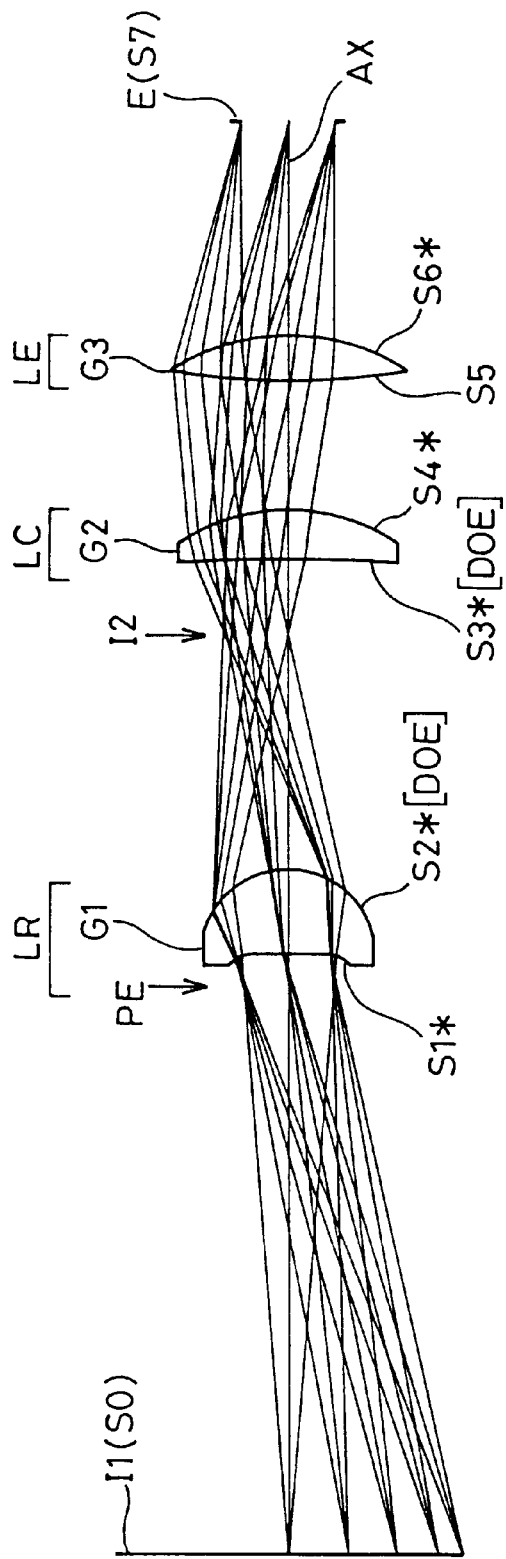
FIG. 5 is a diagram showing the lens construction and optical paths of a second embodiment of the present invention.
Figure 6C:
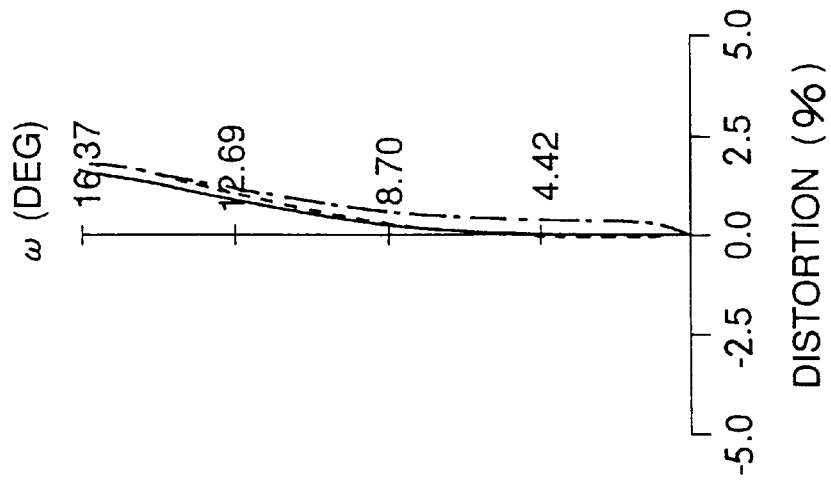
FIGS. 6A to 6C are aberration diagrams showing the aberration observed in the second embodiment.
Figure 6B:
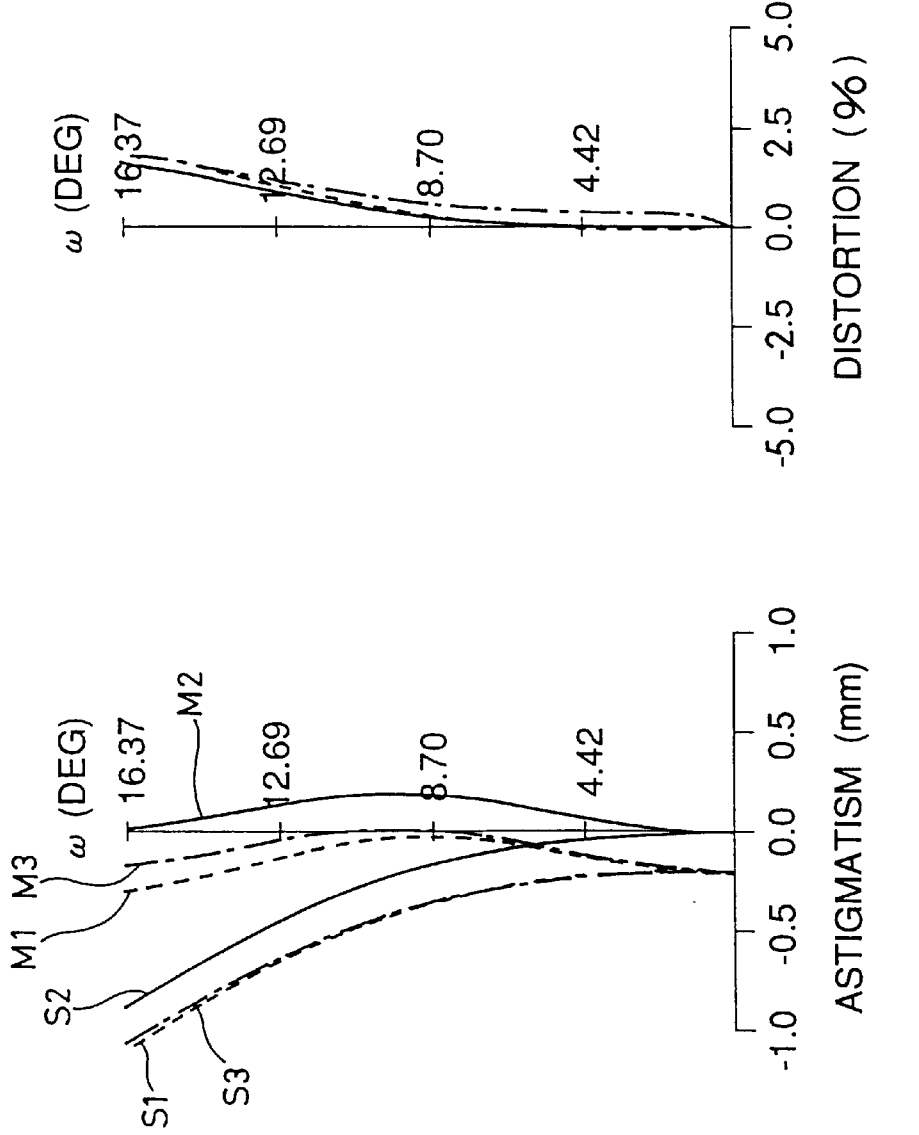
Figure 6A:
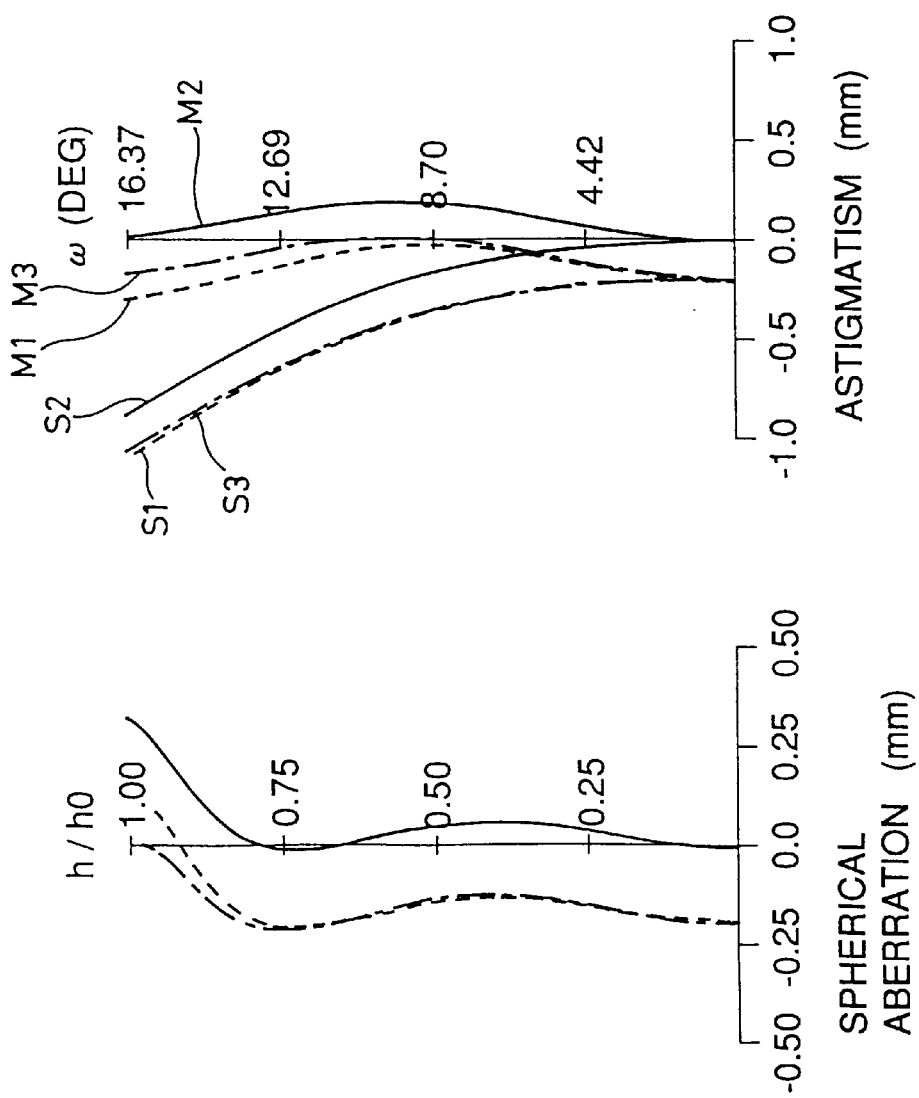
Figure 7:
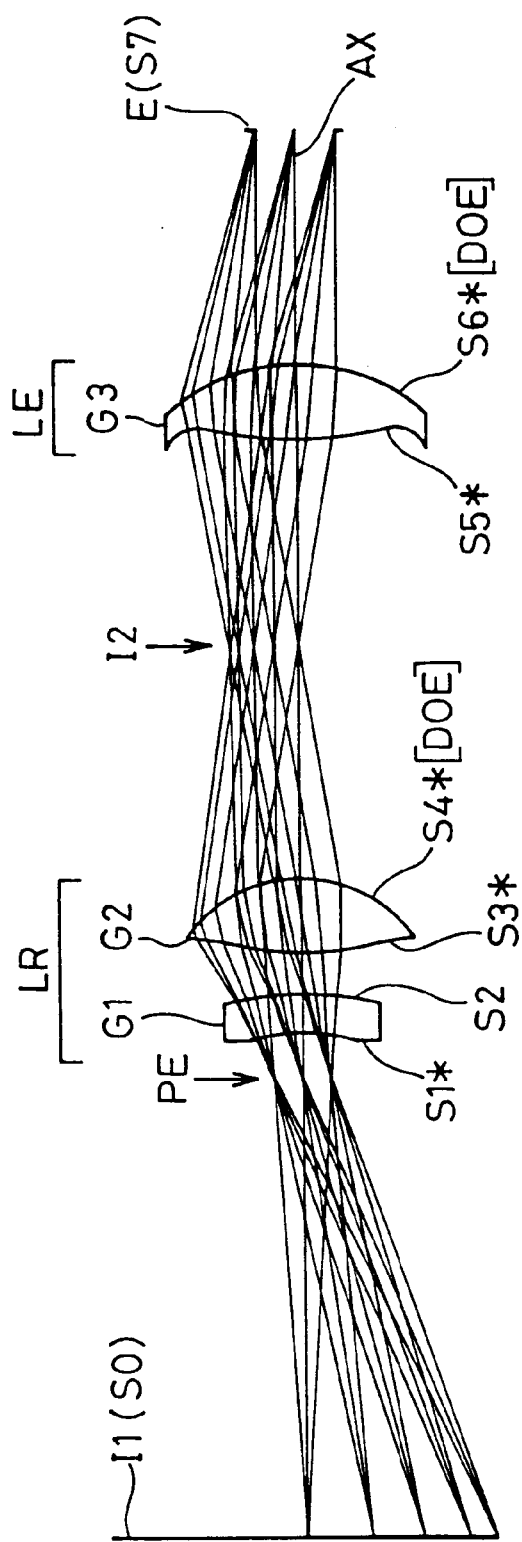
FIG. 7 is a diagram showing the lens construction and optical paths of a third embodiment of the present invention.
Figure 9:
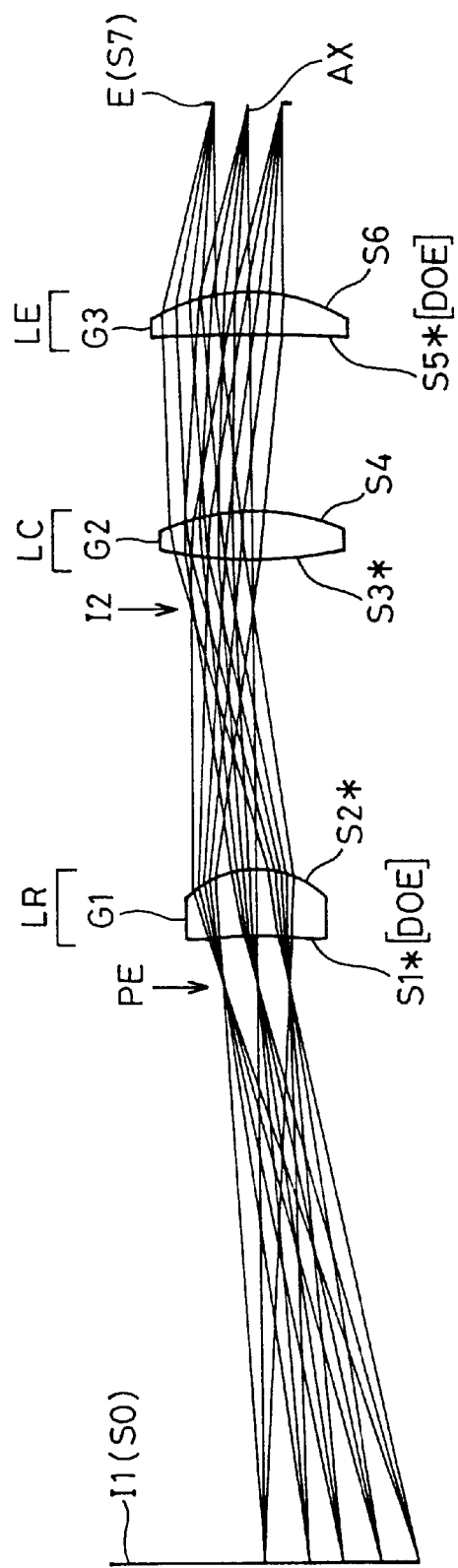
FIG. 9 is a diagram showing the lens construction and optical paths of a fourth embodiment of the present invention.
Figure 10C:
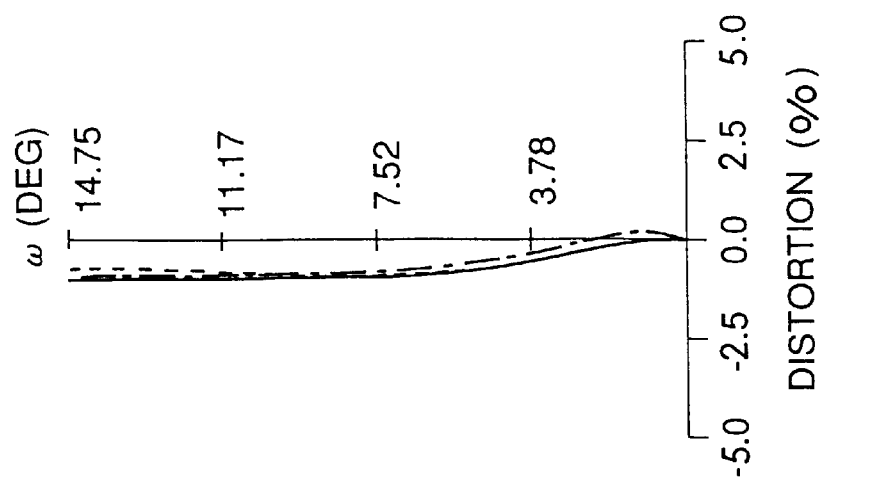
FIGS. 10A to 10C are aberration diagrams showing the aberration observed in the fourth embodiment.
Figure 10B:
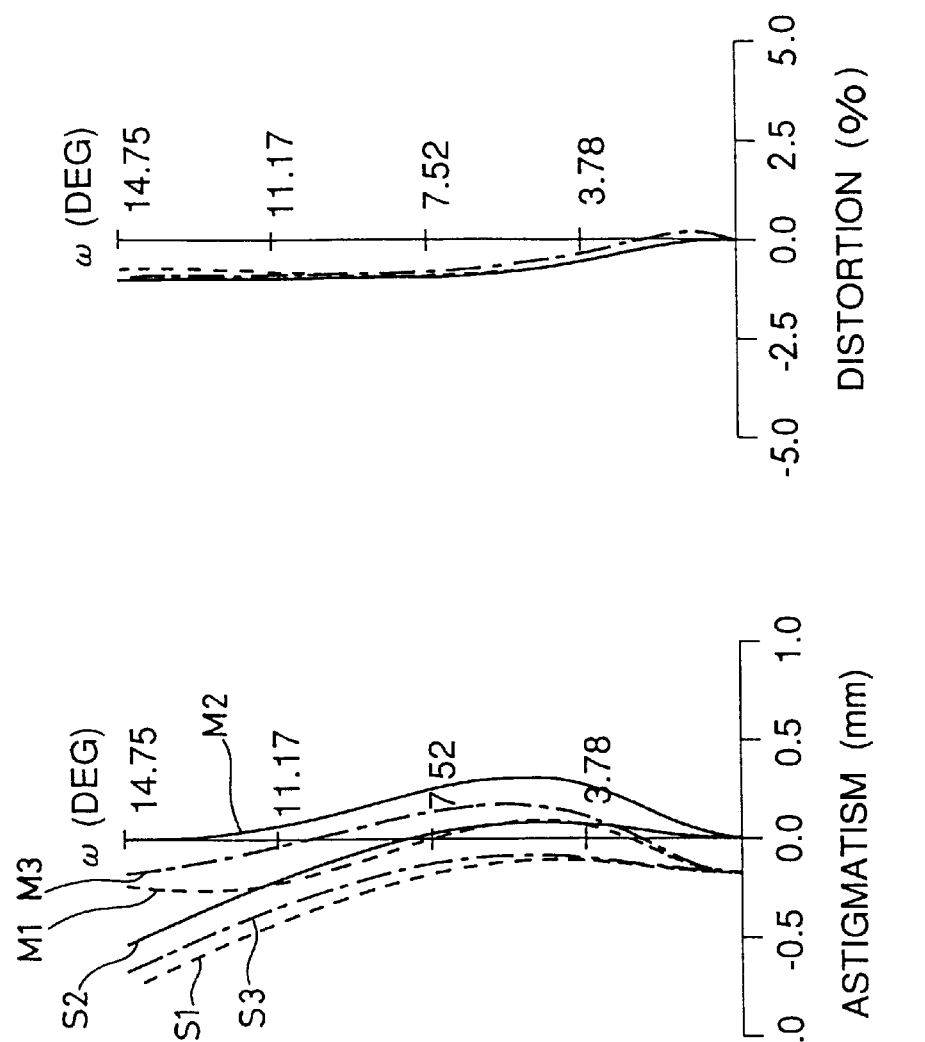
Figure 10A:
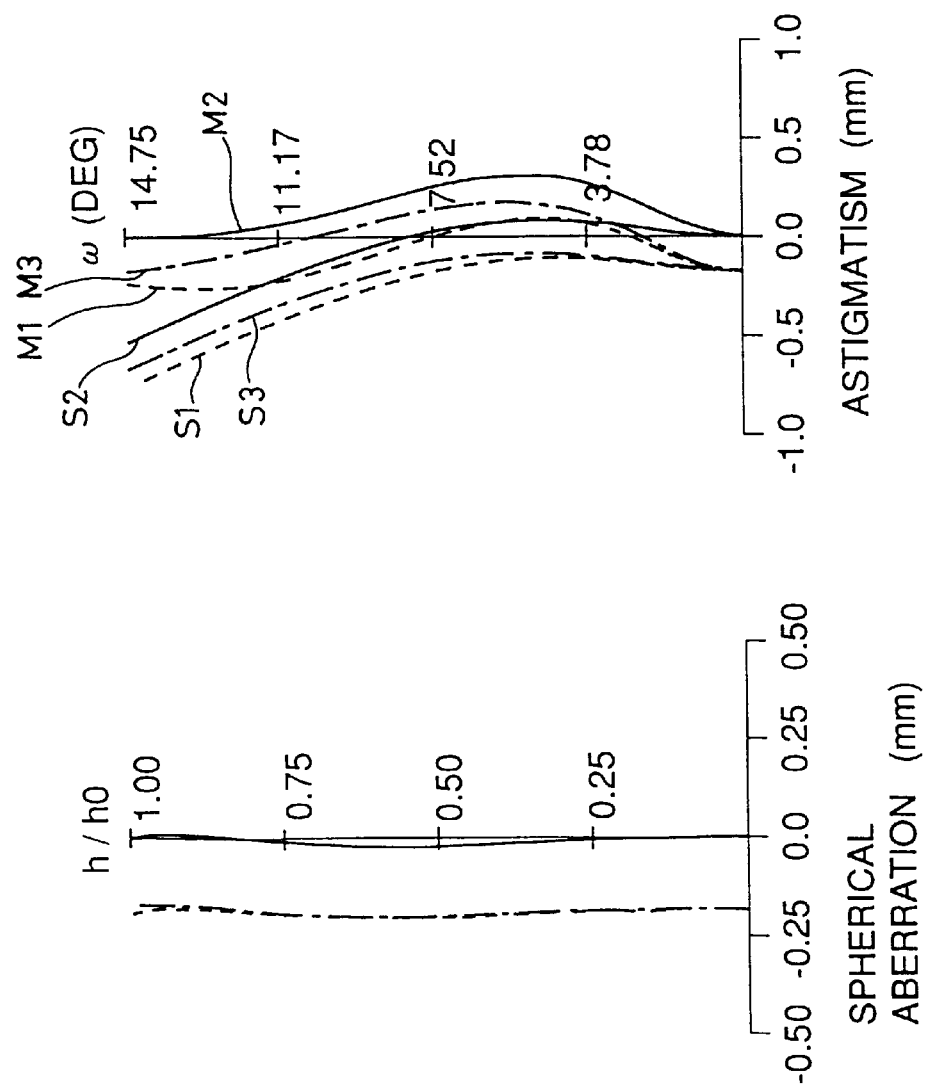

When the power φi' of the diffracting optical surface of the i-th lens is positive (φi'>0), the term φi'/vi' in formulae (C) and (D) is negative (φi'/vi'<0). This means that the diffracting optical surface has optical power that tends to correct both types of chromatic aberration occurring on the refracting optical surfaces. Accordingly, in order to reduce both the coefficient L of axial chromatic aberration and the coefficient T of lateral chromatic aberration, it is necessary to provide each of the lens units having optical power (i.e. the eyepiece lens LE, the condenser lens LC, and the relay lens LR) with a diffracting optical surface so that the term {(φi/vi)+(φi'/vi')} in formulae (C) and (D) becomes equal to zero. However, with regard to the condenser lens LC, since both $h2^2$ and h2·h2# are zero (h2=0, hence $h2^2$=h2·h2#=0), the refracting optical surfaces of the condenser lens LC affect neither the coefficient L of axial chromatic aberration nor the coefficient T of lateral chromatic aberration. Therefore, in order to correct both axial chromatic aberration and lateral chromatic aberration, at least one of the eyepiece lens LE and the relay lens LR needs to be provided with a diffracting optical surface. FIG. 2 shows the chromatic aberration occurring on the refracting and diffracting surfaces of the relay viewfinder optical system (FIG. 1), as observed at some particular positions therein, together with "+", "0", or "−" indications for the values of hi, hi#, and other parameters.

As described above, both axial chromatic aberration and lateral chromatic aberration can be corrected properly by correcting the chromatic aberration occurring on the refracting optical surfaces with the diffracting optical surfaces. This helps reduce the number of lens elements constituting the viewfinder optical system, and thus reduce its weight, size, and cost.

In the first to fourth embodiments, as shown in FIGS. 3, 5, 7, and 9, the relay lens LR is disposed behind the position PE conjugate to the pupil E, and the condenser lens LC and the eyepiece lens LE (only the eyepiece lens LE in the third embodiment) are disposed behind the secondary image 12. Accordingly, as seen from FIG. 2, the axial chromatic aberration occurring on the refracting optical surfaces is positive, and the lateral chromatic aberration occurring on the refracting optical surfaces is slightly positive. In the first, third, and fourth embodiments, since the diffracting optical surface in the eyepiece lens LE has positive power, it is possible to correct the positive axial chromatic aberration occurring on the refracting optical surfaces with the negative axial chromatic aberration occurring on the diffracting optical surface in the eyepiece lens LE. In the second embodiment, since the diffracting optical surface in the condenser lens LC has positive power, it is possible to correct the positive axial chromatic aberration occurring on the refracting optical surfaces with the negative axial chromatic aberration occurring on the diffracting optical surface in the eyepiece lens LE.

However, the above diffracting optical surfaces cause negative lateral chromatic aberration as well. To correct this, in the first to fourth embodiments, a diffracting optical surface having positive power is used in the relay lens LR. This causes positive lateral chromatic aberration in the relay lens LR, and thus helps keep the chromatic aberration over the entire system well-balanced. In this way, by the use of two diffracting optical surfaces having positive power, it is possible to keep the chromatic aberration over the entire system well-balanced.

It is preferable that, as in the first to fourth embodiments, the diffracting optical surface be formed on a refracting optical surface having an aspherical shape. The power of the diffracting optical surface offers some of the effects that are obtained by the use of an aspherical surface, but, as long as the diffracting optical surface is formed on a refracting optical surface (base surface) that is a spherical surface, it is impossible to eliminate chromatic spherical aberration and chromatic coma. If the diffracting optical surface is formed on an aspherical surface, it is possible to correct basic spherical aberration with the aspherical surface, and to correct chromatic aberration with the diffracting optical surface formed thereon. In addition, it is possible to shape the aspherical surface and the diffracting optical surface at the same time by, for example, machining. This leads to the reduction of production time, and to the improvement of production accuracy.

In the first, third, and fourth embodiments, it is preferable that condition (1) below be satisfied:

$$\left|\frac{\phi Rd}{\phi Rt} - \frac{\phi Ed}{\phi Et}\right| < 0.1 \tag{1}$$

where $\phi Rd$: the optical power of diffraction of the diffracting optical surface included in the relay lens;

$\phi Rt$: the composite optical power of diffraction and refraction of the diffracting and refracting optical surfaces included in the relay lens;

$\phi Ed$: the optical power of diffraction of the diffracting optical surface included in the eyepiece lens;

$\phi Et$: the composite optical power of diffraction and refraction of the diffracting and refracting optical surfaces included in the eyepiece lens.

If the diffracting optical surfaces provided in the relay lens LR and the eyepiece lens LE satisfy condition (1), it is possible to obtain satisfactory aberration characteristics. If the upper or lower limit of condition (1) is exceeded, it is not possible to keep axial chromatic aberration and lateral chromatic aberration well-balanced, and thus it is not possible to obtain desired optical performance.

In the second embodiment, it is preferable that condition (2) below be satisfied:

$$\left|\frac{\phi Rd}{\phi Rt} - \frac{\phi Cd}{\phi Ct}\right| < 0.1 \tag{2}$$

where $\phi Rd$: the optical power of diffraction of the diffracting optical surface included in the relay lens;

$\phi Rt$: the composite optical power of diffraction and refraction of the diffracting and refracting optical surfaces included in the relay lens;

$\phi Cd$: the optical power of diffraction of the diffracting optical surface included in the condenser lens;

$\phi Ct$: the composite optical power of diffraction and refraction of the diffracting and refracting optical surfaces included in the condenser lens.

If the diffracting optical surfaces provided in the relay lens LR and the condenser lens LC satisfy condition (2), it is possible to obtain satisfactory aberration characteristics. If the upper or lower limit of condition (2) is exceeded, it is not possible to keep axial chromatic aberration and lateral chromatic aberration well-balanced, and thus it is not possible to obtain desired optical performance.

Next, a description will be given below as to why the use of a diffracting optical surface makes it possible to compose a viewfinder optical system exclusively of plastic lenses, as in the above described embodiments. In conventional optical systems, chromatic aberration is corrected with a combination of a lens having negative power and a small Abbe number νd (i.e. having strong dispersion) and a lens having positive power and a large Abbe number νd (i.e. having weak dispersion). Accordingly, to correct chromatic aberration properly, it is necessary to select lens materials having appropriate Abbe numbers νd from various materials having widely varying Abbe numbers νd. However, since there are only few kinds of plastic that can be used as optical materials, it is not possible to freely select materials having appropriate Abbe numbers νd for plastic lenses. Nevertheless, since a diffracting optical surface has, as described earlier, remarkably large negative dispersion (ν'=−3.45), it is possible to control chromatic aberration freely by the use of a diffracting optical surface even if it has only small power. Accordingly, the use of a diffracting optical surface eliminates the need to use a combination of lenses having widely different dispersion, and thus makes it possible to compose an optical system exclusively of plastic lenses.

It is preferable that the plastic lenses be made of PMMA or amorphous polyolefin-based resin. Since both PMMA and amorphous polyolefin-based resin have a large Abbe number νd, their use helps reduce the above-noted term $\phi i/\nu i$. Accordingly, a diffracting optical surface formed on a lens made of such materials can effectively correct chromatic aberration over the entire spectrum of light. In addition, these materials have other properties that make them suitable for use in optical systems; for example, PMMA is easy to mold, and amorphous polyolefin-based resin suffers little from moisture absorption.

Moreover, where chromatic aberration is corrected by the use of a diffracting optical surface as in the above described embodiments, it is possible to compose the entire optical system exclusively with lenses having positive power, and thus it is possible to compose the optical system with a minimal number of lens elements. A description will be given below as to how chromatic aberration is corrected by the use of a diffracting optical surface. In the following description, it is assumed that a refracting optical surface having positive power and a diffracting optical surface having positive power are used to correct chromatic aberration.

Figure 11:
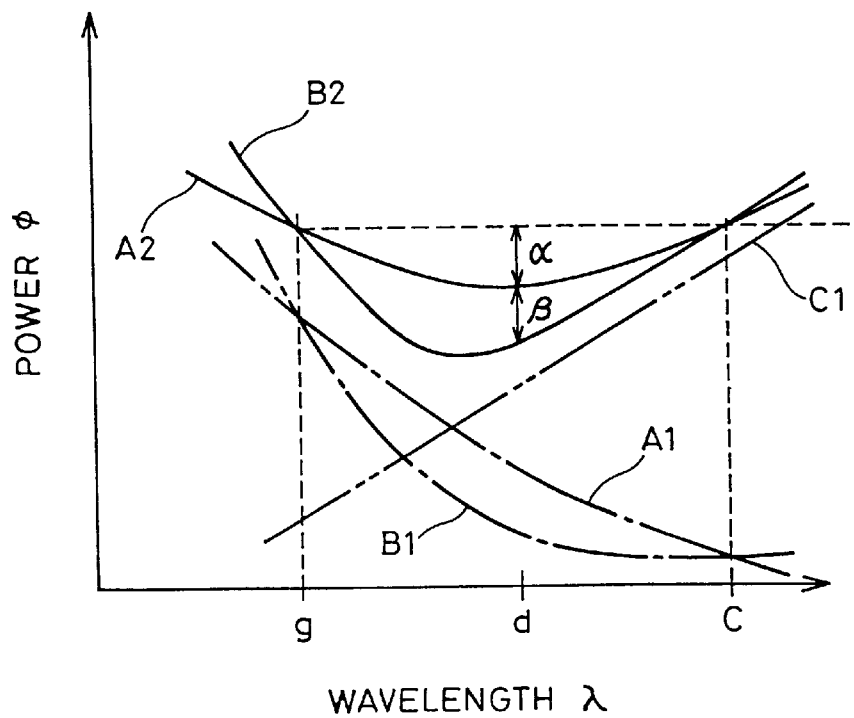
FIG. 11 is a graph schematically showing the relationship between the power of a lens and the wavelength, for lenses made of materials having different Abbe numbers.

FIG. 11 is a chart schematically showing the relation between the power φ of a lens and the wavelength λ, for lenses A and B made of materials having different Abbe numbers. Of these 10 two lenses, lens A is made of a material having a larger Abbe number vd (having weaker dispersion), and lens B is made of a material having a smaller Abbe number vd (having stronger dispersion). Although lenses A and B have spherical surfaces of the same radius of curvature as their refractive optical surfaces, the power of the refractive optical surfaces of lenses A and B vary in different ways with the wavelength λ because of the difference of their Abbe numbers, as indicated by the dash-dot lines A1 and B1 (FIG. 11), respectively.

Now, assume that diffracting optical surfaces having the same positive power are individually formed on the refracting optical surfaces of lenses A and B so that the refracting optical surfaces are combined with diffracting optical surfaces. Then, since the diffracting optical surfaces have a negative Abbe number v', their power vary as indicated by the dash-dot-dot line C1 (FIG. 11) with the wavelength λ. When the power is set to be equal for g-lines and c-lines (i.e. when chromatic aberration is corrected), the composite power of the refracting and diffracting surfaces of lenses A and B vary as indicated by the solid lines A2 and B2 (FIG. 11) with the wavelength λ.

Comparison of the solid line A2 with the solid line B2 shows that, even if the power is equal for g-lines and c-lines, the power for light rays other than g-lines and c-lines still varies with the wavelength λ. For example, for d-lines, the deviation α of the composite power of the refracting and diffracting optical surfaces of lens A is smaller than the deviation α+β of the composite power of the refracting and diffracting optical surfaces of lens B. This means that, even when diffracting optical surfaces having the same power is combined with refracting optical surfaces having the same radius of curvature, better correction of chromatic aberration can be achieved on the whole with a refracting optical surface made of a material having a larger Abbe number vd.

Where chromatic aberration is corrected by the use of a diffracting optical surface as in the above described embodiments, it is preferable to use a material having an Abbe number larger than 50 as the lens material. By composing an optical system exclusively of lenses made of plastic having an Abbe number larger than 50, it is possible to reduce the deviations of the power for d-lines, g-lines, and c-lines, and thus to improve the chromatic aberration characteristics of the entire optical system even if it is constituted of positive lenses alone. In this way, it is possible to compose the optical system with a minimal number of lens elements.

Tables 2 to 5 list the construction data of the viewfinder optical systems of the first to fourth embodiments (FIGS. 3, 5, 7, and 9), respectively.

In the construction data of tables 2 to 5, Si (i=0, 1, 2, 3, . . . ) represents the i-th surface from the focal plane S0 side (i.e. from the primary image I1 side), ri (i=0, 1, 2, 3, . . . ) represents the radius of curvature of the i-th surface from the focal plane S0 side, di (i=0, 1, 2, 3, . . . ) represents the i-th axial distance from the focal plane S0 side, and Ni (i=1, 2, . . . ) and vi (i=1, 2, . . . ) respectively represent the index of refraction (Nd) and the Abbe number (vd), for d-lines, of the i-th lens Gi (i=1, 2, 3) from the focal plane S0 side.

In the construction data of the first to fourth embodiments, a surface Si marked with an asterisk (*) is an aspherical surface. The shape of an aspherical surface is defined by formula (AS) below:

$$X = \frac{C \cdot Y^2}{1 + \{1 - (1+K) \cdot C^2 \cdot Y^2\}^{1/2}} + \sum_i A i Y^i \quad \text{(AS)}$$

where
X: the displacement from the reference plane of the optical axis direction;
Y: the height in a direction perpendicular to the optical axis;
C: the paraxial curvature;
K: the conic coefficient;
Ai: the aspherical coefficient of the i-th degree.

In the construction data of the first to fourth embodiments, a surface Si marked with [DOE] is a surface where a diffracting optical surface is formed on a refracting optical surface. The pitch of a diffracting optical surface is determined by its phase shape, which is defined by formula (DS) below:

$$\phi(H) = 2\pi \cdot \left( \sum_i C i H^{2i} \right) \Big/ \lambda 0 \quad \text{(DS)}$$

where
φ(H): the phase function of the diffracting optical surface;
Ci: the phase function coefficient of the diffracting optical surface of the 2i-th order;
H: the height in a direction perpendicular to the optical axis;
λ0: the design reference wavelength (=546.07×10$^{-6}$ mm).

Table 6 lists the value corresponding to conditions (1) and (2) {|(φRd/φRt)−(φEd/φEt)|, |(φRd/φRt)−(φCd/φCt)|} and related values (φRd, φRt, φEd, φEt, φCd, φCt) as observed in each embodiment.

FIGS. 4A to 4C, 6A to 6C, 8A to 8C, and 10A to 10C are aberration diagrams showing the aberration observed in the first to fourth embodiments, respectively (the order of diffraction of the diffracting optical surfaces: +1). In these aberration diagrams, a broken line represents aberration for c-lines (wavelength: λc=656.3 nm), a solid line represents aberration for e-lines (wavelength: λe=546.1 nm), and a dash-dot line represents aberration for g-lines (wavelength: λg=435.8 nm). In these aberration diagrams, aberration is plotted in millimeters and on the assumption that the entire system forms an imaging optical system having at the pupil E position an ideal lens with a focal length of $f_{id}$=20. Spherical aberration is plotted in relation to h/h0, which is the radius h of the pupil E standardized by its maximum effective diameter h0, and astigmatism and distortion are plotted in relation to half the angle of view ω°. Moreover, in these aberration diagrams, S1 to S3 indicate astigmatism on the sagittal plane, and M1 to M3 indicate astigmatism on the meridional plane.

As described above, according to the present invention, it is possible to have a viewfinder optical system that can correct chromatic aberration properly with a reduced number of lens elements. In other words, since both axial chromatic aberration and lateral chromatic aberration are corrected properly by diffracting optical surfaces as described above, it is possible to greatly reduce the number of lens elements. As a result, it is possible to reduce the weight, size, and cost of viewfinder optical systems.

Moreover, according to the present invention, the use of at least one diffracting optical surface in an optical system makes it possible to realize an optical system that, despite being composed exclusively of plastic lenses, achieves proper correction of both axial chromatic aberration and lateral chromatic aberration. Furthermore, since both types of chromatic aberration are corrected properly by such a diffracting optical surface, it is possible to greatly reduce the number of lens elements constituting an optical system, and thus it is possible to reduce the weight, size, and cost of the optical system. Moreover, since an optical system can be composed exclusively of plastic lenses, it is possible to further reduce the weight of the optical system. In addition, since plastic lenses can be produced by molding, diffracting optical surfaces can be massproduced at low cost.

Figure 12:
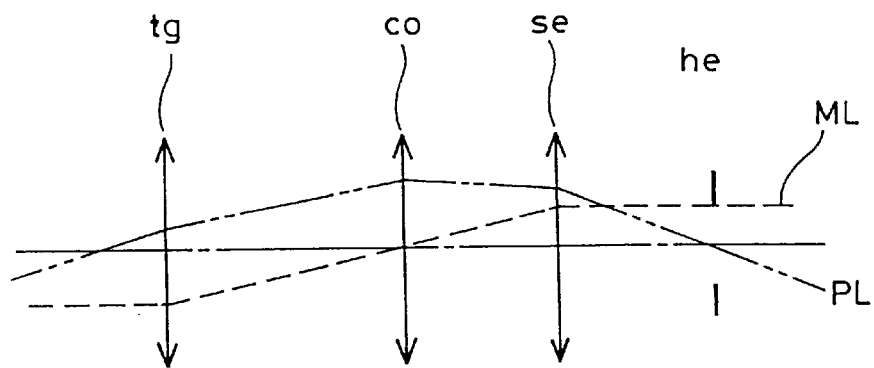
FIG. 12 is a diagram schematically showing the paraxial power arrangement and optical paths of a typical Kepler-type real-image viewfinder optical system.

FIG. 12 shows the paraxial power arrangement of a typical Kepler-type real-image viewfinder optical system. In FIG. 12, the light ray passing through the center of the pupil he is the ideal principal ray PL, and the light ray passing through the pupil he perpendicularly thereto is the ideal marginal ray ML. In this optical system, an objective lens tg forms an image of an object in the vicinity of a condenser lens co, and the thus formed image is then magnified by an eyepiece lens se so that the image is observed from the position of the pupil he behind the eyepiece lens se.

As mentioned in formulas (A) through (E) of the first and second embodiments, it is understood that a diffracting optical surface has a remarkably small negative Abbe number equivalent value of v'=−3.45. Since normal lenses having only refracting optical surfaces have an Abbe number (representing their dispersion) ranging from 20–80, combined use of refracting and diffracting optical surfaces allows the positive term $\phi i/vi$ to be canceled out by the negative term $\phi i'/vi'$. This means that the chromatic aberration occurring on the refracting optical surfaces can be corrected with the diffracting optical surfaces.

When a diffracting optical surface is provided only in the eyepiece lens se, the chromatic aberration occurring in the eyepiece lens se is corrected, but the chromatic aberration occurring in the objective lens tg remains uncorrected. When a diffracting optical surface is provided only in the objective lens tg, the chromatic aberration occurring in the objective lens tg is corrected, but the chromatic aberration occurring in the eyepiece lens se remains uncorrected. The viewfinder optical systems of the fifth and sixth embodiments, which will be presented later, are characterized in that a diffracting optical surface is provided both in the objective lens tg and in the eyepiece lens se. When a diffracting optical surface is provided both in the objective lens tg and in the eyepiece lens se, the chromatic aberration occurring in each of the lenses tg and se can be individually corrected by the diffracting optical surface provided in each lens, and thus it is possible to correct chromatic aberration properly over the entire viewfinder optical system.

It is preferable that diffracting optical surfaces be introduced to the objective lens tg and the eyepiece lens se by providing each of these lenses tg and se with a diffracting optical element that has a diffracting optical surface formed on a refracting optical surface (i.e. a diffracting/refracting hybrid lens). This is because the use of such hybrid lenses not only makes it possible to correct the chromatic aberration occurring on the refracting optical surfaces by the use of the diffracting optical surface, but also eliminates the need to use additional optical elements (e.g. negative lenses) for chromatic aberration correction. Thus, as compared with the optical system where chromatic aberration is corrected by the use of negative lenses in the objective lens tg or in the eyepiece lens se, it is possible to reduce the number of the lens elements.

In a typical Kepler-type real-image viewfinder optical system, a field-of-view mask (field-of-view frame) is provided on the image plane of the objective lens tg to limit the field of view. Improper correction of chromatic aberration within the eyepiece lens se directly affects the image formed on the field-of-view mask, with the result that the field-of-view mask appears colored. However, in the viewfinder optical systems of the fifth and sixth embodiments, presented later, since the chromatic aberration occurring in the eyepiece lens se is corrected by the diffracting optical surface provided in the eyepiece lens se, such coloring of the field-of-view mask never occurs.

It is preferable that the eyepiece lens se is composed of a positive single lens. By composing the eyepiece lens se of a single lens, it is possible to reduce the number of lens elements and simplify the construction of the viewfinder optical system.

Figure 13A:
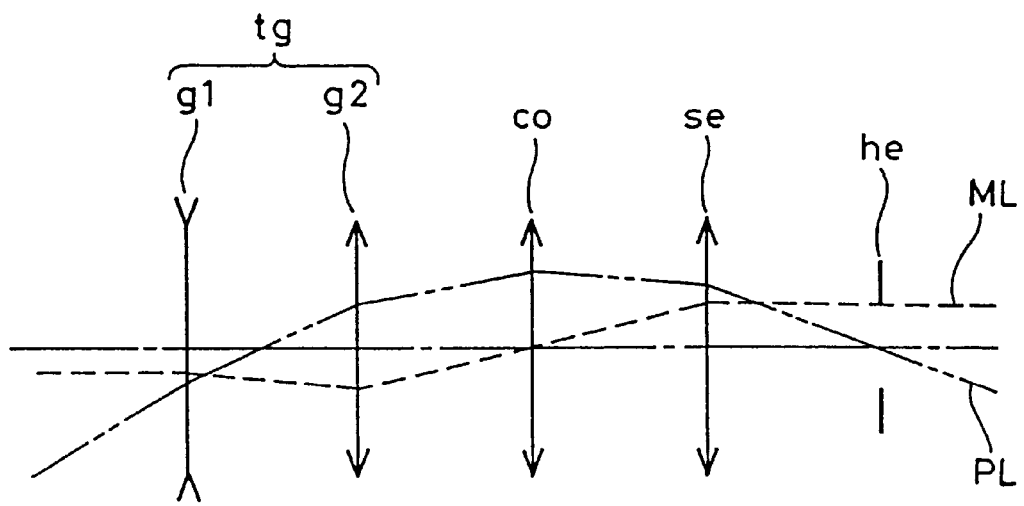
FIGS. 13A and 13B are diagrams schematically showing the paraxial power arrangement and optical paths of a Kepler-type real-image viewfinder optical system whose objective lens is a zoom lens system.
Figure 13B:
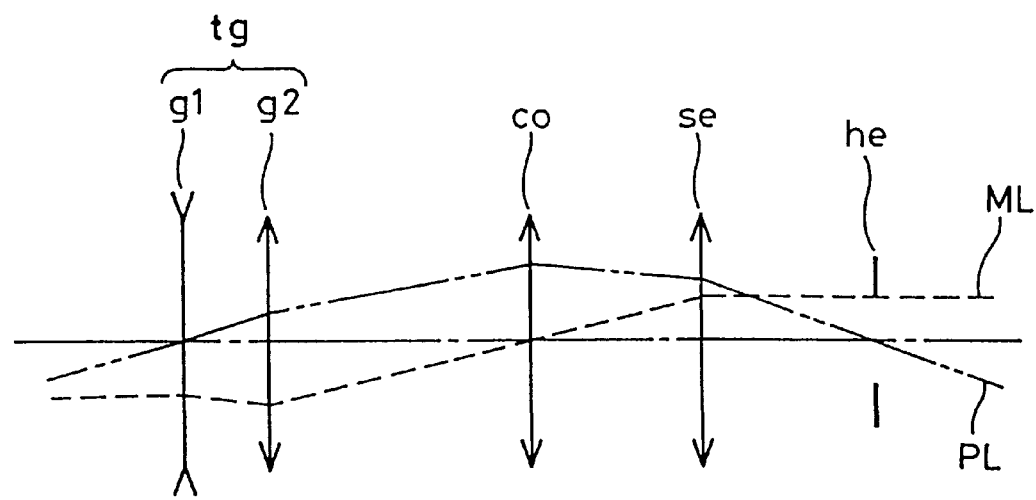

When the viewfinder optical systems of the fifth and sixth embodiments, presented later, are further provided with a zoom function, it is preferable that a zoom lens system is used as the objective lens tg, and that a diffracting optical surface is provided in the lens unit that is moved to achieve zooming. FIGS. 13A and 13B show the paraxial power arrangement of a viewfinder optical system whose objective lens tg is a zoom lens system, with FIG. 13A illustrating the wide-angle state and FIG. 13B illustrating the telephoto state. Here, the objective lens tg is constructed as a typical zoom lens system consisting, from the object side, a first lens unit g1 having negative power and a second lens unit g2 having positive power. The second lens unit g2 is a variator that mainly serves to control zooming, and the first lens unit g1 is a compensator that serves to adjust the position of the image plane.

From FIGS. 13A and 13B, it will be understood that, with the movement of the second lens unit g2 that has the longer distance to move, the heights h and h' significantly vary in the second lens unit g2. This means that the degree of chromatic aberration significantly varies during zooming. Accordingly, if a diffracting optical surface is provided in the lens units g1 and g2 that are moved for zooming, it is possible to reduce the variation of chromatic aberration during zooming. That is, in a viewfinder optical system whose objective lens tg is a two-unit zoom lens system consisting of negative and positive lens units, it is possible to correct chromatic aberration properly over the entire zoom range if a diffracting optical surface is provided at least in the first lens unit g1 or in the second lens unit g2.

In a viewfinder optical system whose objective lens tg is a zoom lens system and in which a diffracting optical surface is provided in the lens unit that is moved to achieve zooming, it is preferable that condition (3) below be satisfied:

$$0.1 < \left| \frac{\phi OD \cdot \phi E}{\phi O \cdot \phi ED} \right| < 2.0 \tag{3}$$

where $\phi OD$: the optical power of diffraction of the diffracting optical surface included in the objective lens;

φO: the composite optical power of diffraction and refraction of the diffracting and refracting optical surfaces included in the objective lens;

φED: the optical power of diffraction of the diffracting optical surface included in the eyepiece lens;

φE: the composite optical power of diffraction and refraction of the diffracting and refracting optical surfaces included in the eyepiece lens.

In condition (3), φOD/φO represents the amount of chromatic aberration corrected by the diffracting optical surface in the objective lens tg, and φED/φE represents the amount of chromatic aberration corrected by the diffracting optical surface in the eyepiece lens se. Condition (3) defines the balance of chromatic aberration corrected in the objective lens tg and in the eyepiece lens se. When condition (3) is satisfied, it is possible to achieve well-balanced correction of chromatic aberration in the objective lens tg and in the eyepiece lens se. If the lower limit of condition (3) is exceeded, chromatic aberration is undercorrected in the objective lens tg. If the upper limit of condition (3) is exceeded, chromatic aberration is undercorrected in the eyepiece lens se.

Figure 14:
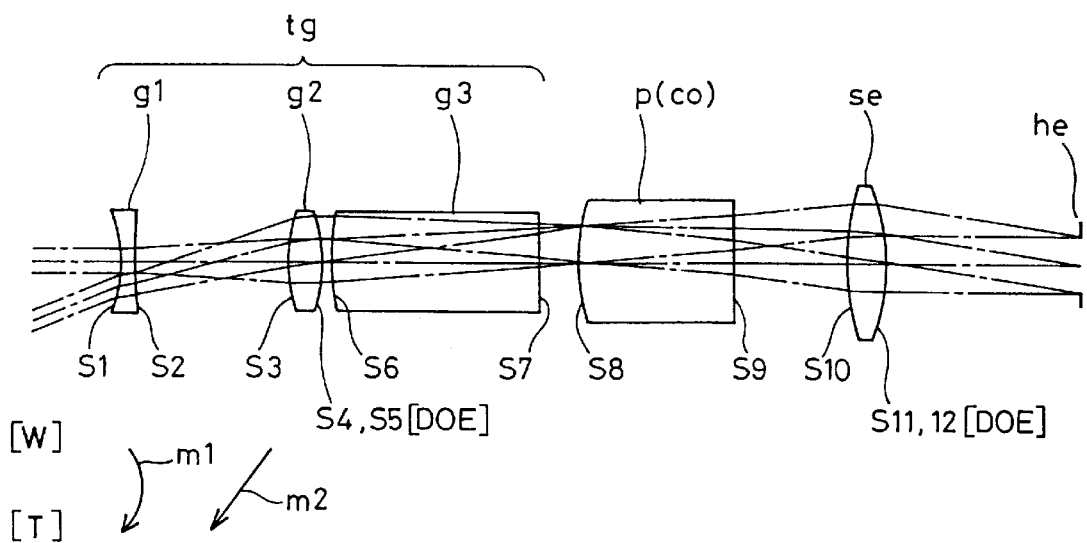
FIG. 14 is a diagram showing the lens construction and optical paths of a fifth embodiment of the present invention.
Figure 15:
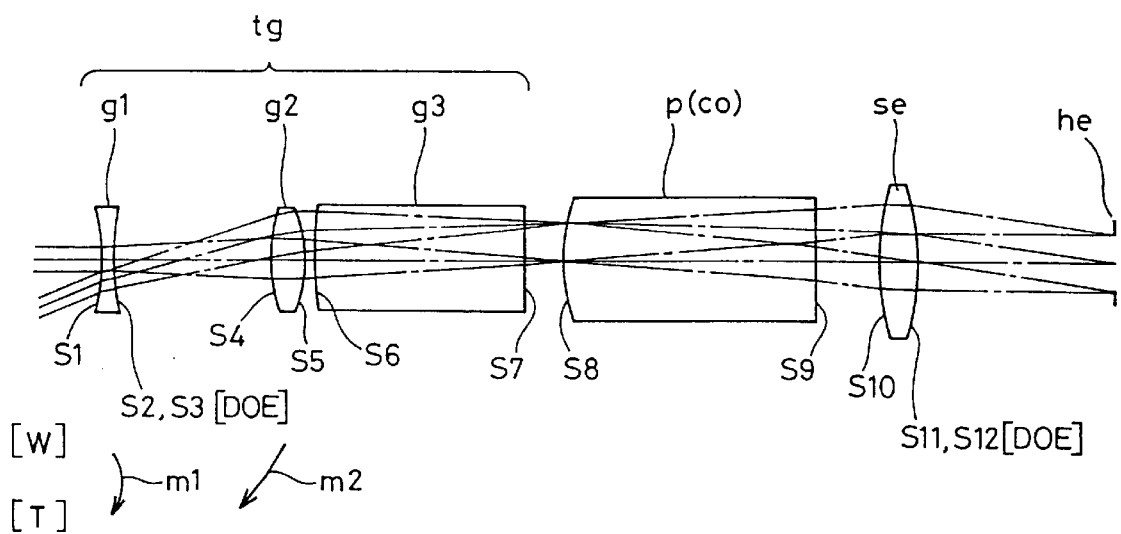
FIG. 15 is a diagram showing the lens construction and optical paths of a sixth embodiment of the present invention.

FIGS. 14 and 15 show the lens construction and optical paths of the viewfinder optical systems of a fifth and a sixth embodiment, respectively, of the present invention, at their wide-angle end [W]. In FIGS. 14 and 15, arrows m1 and m2 indicate the movement of the first and second lens units g1 and g2, respectively, during zooming from the wide-angle end [W] to the telephoto end [T]

Tables 7 and 8 list the construction data of the viewfinder optical systems of the fifth and sixth embodiments (FIGS. 14 and 15), respectively.

In the construction data of tables 7 and 8, Si (i=1, 2, ...) represents the i-th surface from the object side, ri (i=1, 2, ...) represents the radius of curvature of the i-th surface Si from the object side, and di (i=1, 2, ...) represents the i-th axial distance from the object side. For axial distances that vary with zooming (variable distances), two values are listed, which are, from the left, the surface-to-surface distances between the related lens units at the wide-angle end [W] and at the telephoto end [T]. Moreover, Ni (i=1, 2, ...) represents the index of refraction (Ne) for e-lines of the i-th lens element from the object side, and vi (i=1, 2, ...) represents the Abbe number (vd) for d-lines of the i-th lens element from the object side. The symbol of an optical element is given on the right side of its Abbe number. Listed together with the construction data are the viewfinder magnification β, the value corresponding to condition (3) {|φOD·φE/(φO·φED)|}, and the values related thereto (φO, φOD, φE, φED) at the wide-angle end [W] and at the telephoto end [T].

In the construction data of the fifth and sixth embodiments, a surface Si marked with [DOE] is a surface where a diffracting optical surface is formed on a refracting optical surface, and a surface S1 marked with an asterisk (*) is an aspherical surface. The shape of an aspherical surface is defined by formula (AS) below:

$$Y = \frac{C \cdot X^2}{1 + (1 - \epsilon \cdot X^2 \cdot C^2)^{1/2}} + \sum_i Ai \cdot X^i \quad \text{(AS)}$$

where

Y: the displacement from the reference plane of the optical axis direction;

X: the height in a direction perpendicular to the optical axis;

C: the paraxial curvature;

ε: the quadric surface parameter;

Ai: the aspherical coefficient of the i-th degree.

Figure 16A:
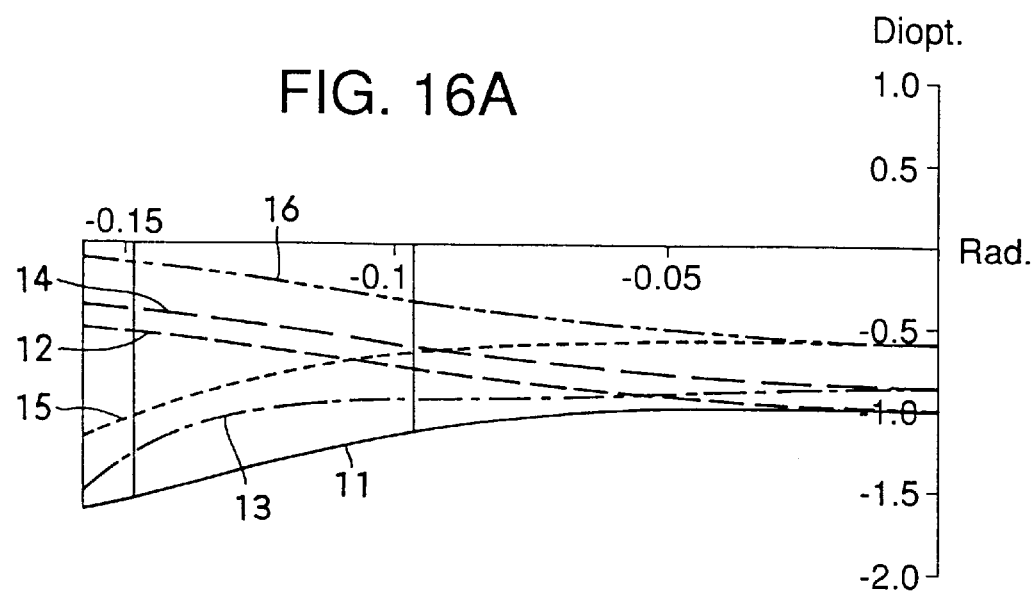
FIGS. 16A to 16C are aberration diagrams showing the aberration observed at the wide-angle end of the fifth embodiment.
Figure 16B:
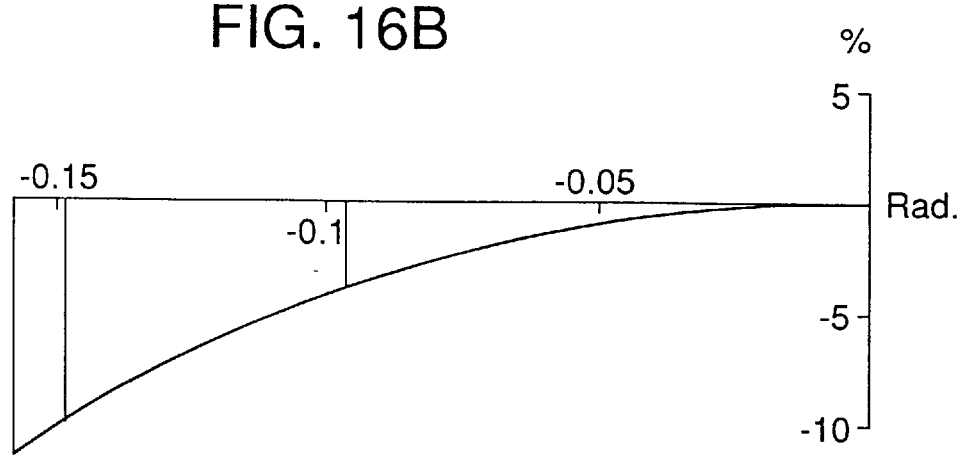
Figure 16C:
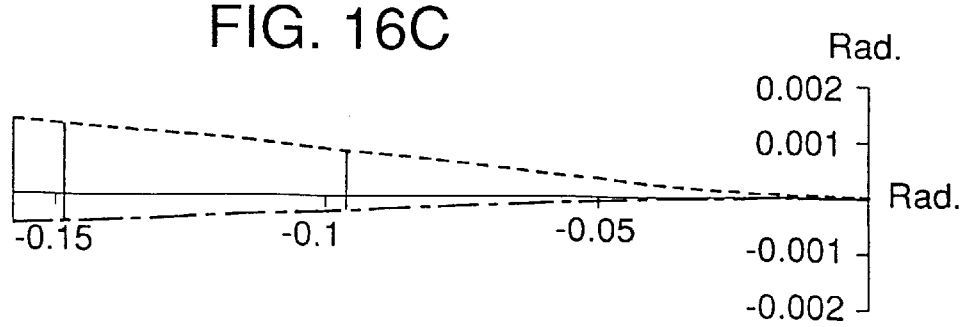
Figure 17A:
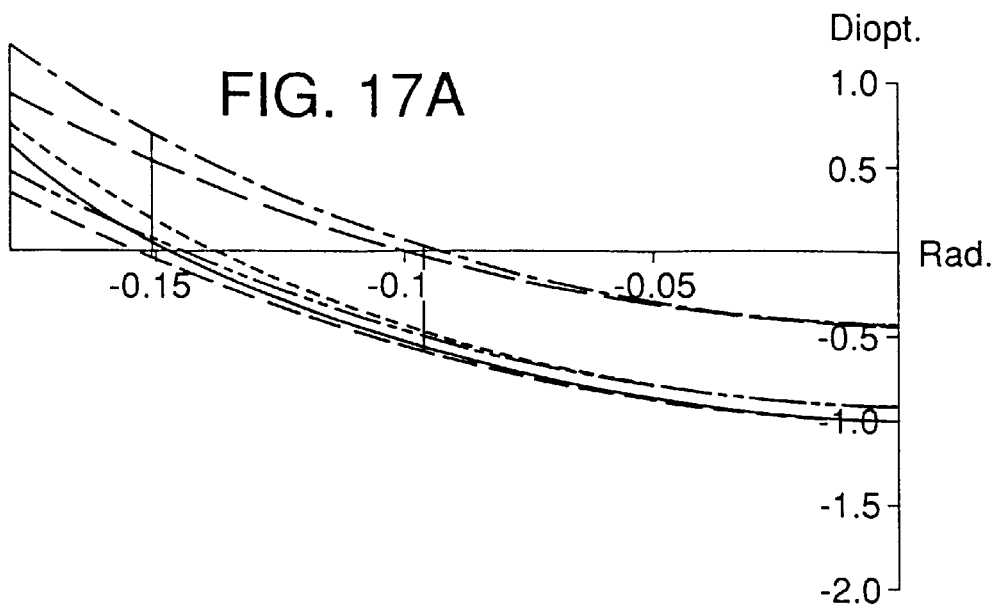
FIGS. 17A to 17C are aberration diagrams showing the aberration observed at the telephoto end of the fifth embodiment.
Figure 17B:
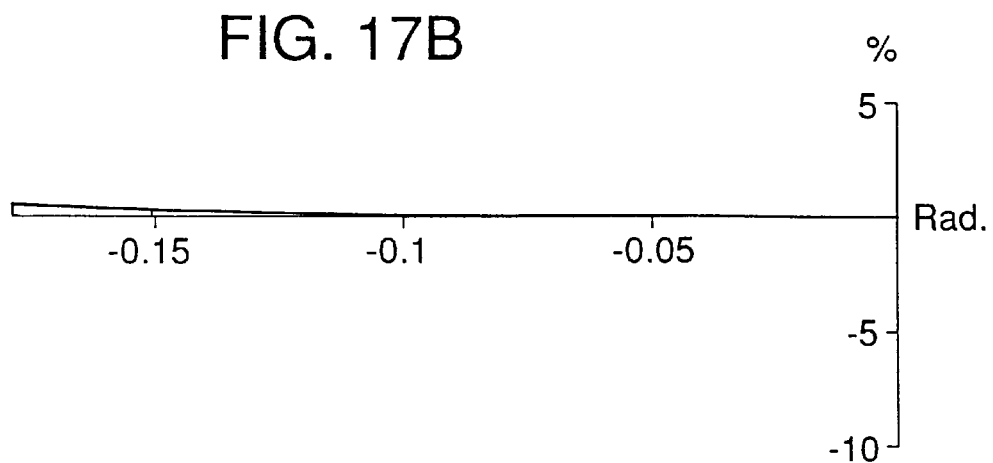
Figure 17C:
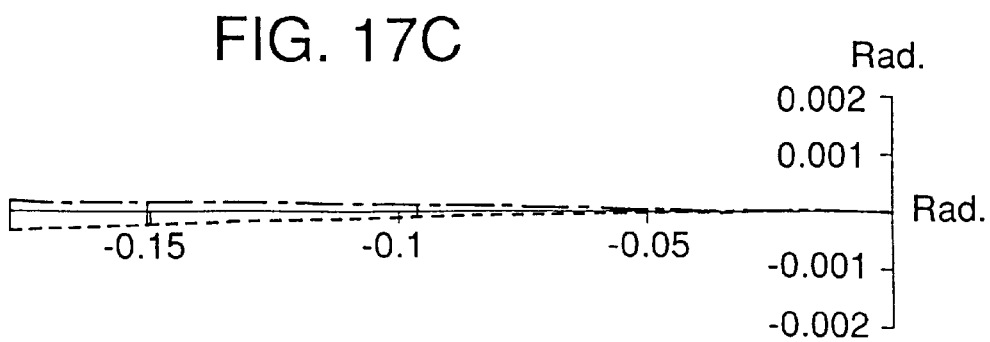
Figure 18A:
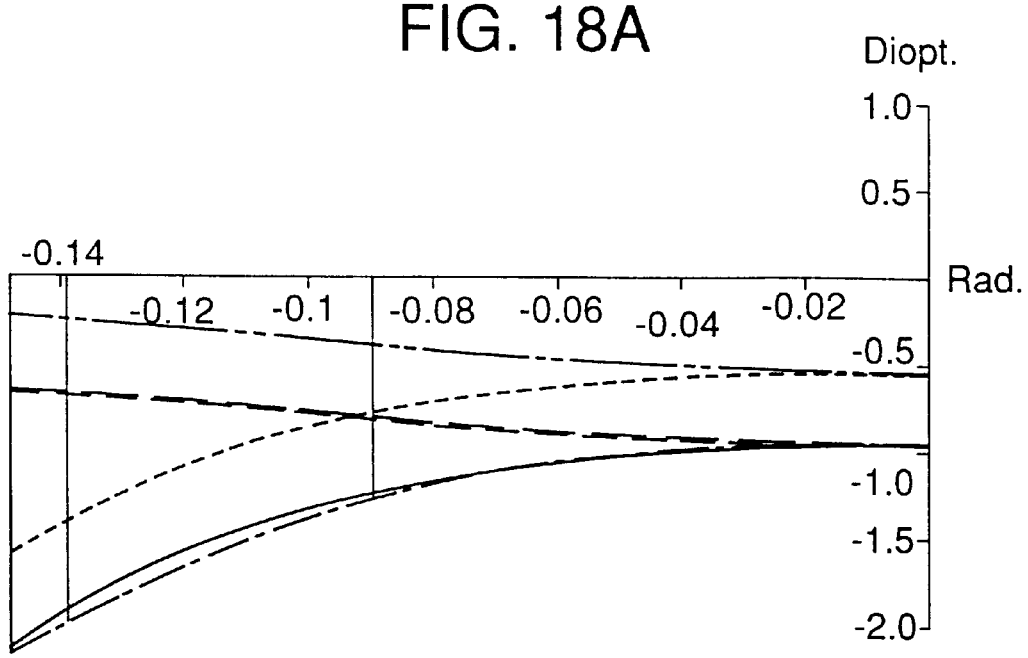
FIGS. 18A to 18C are aberration diagrams showing the aberration observed at the wide-angle end of the sixth embodiment.
Figure 18B:
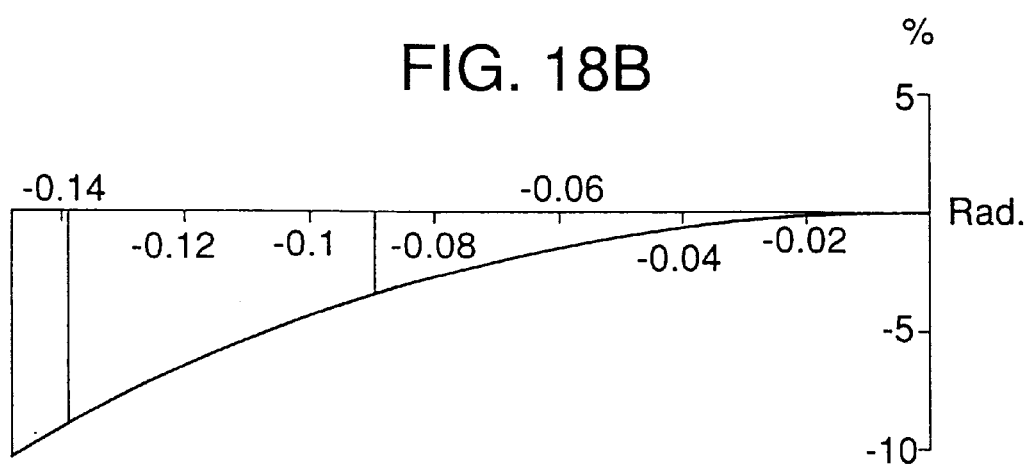
Figure 18C:
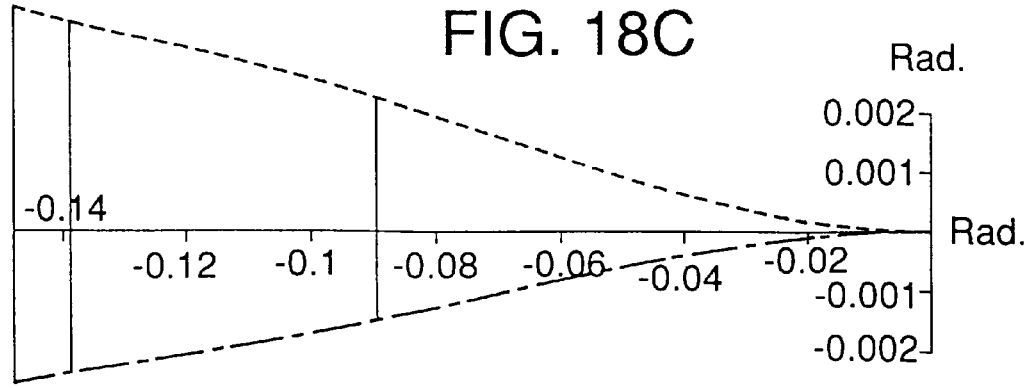
Figure 19A:
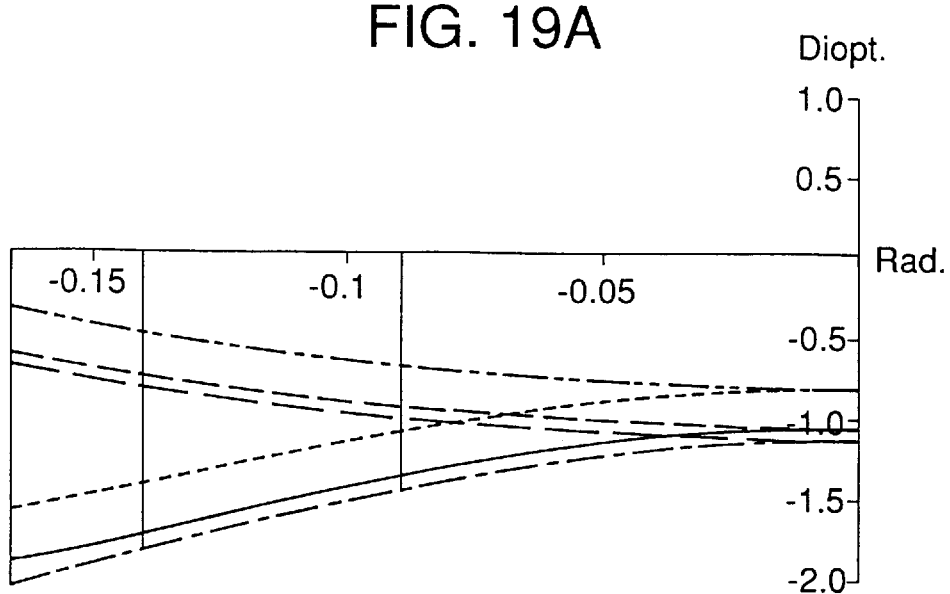
FIGS. 19A to 19C are aberration diagrams showing the aberration observed at the telephoto end of the sixth embodiment.
Figure 19B:
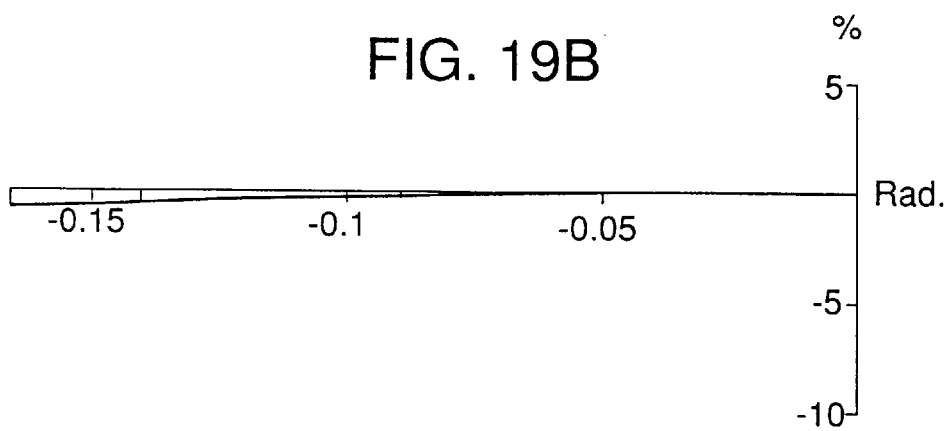
Figure 19C:
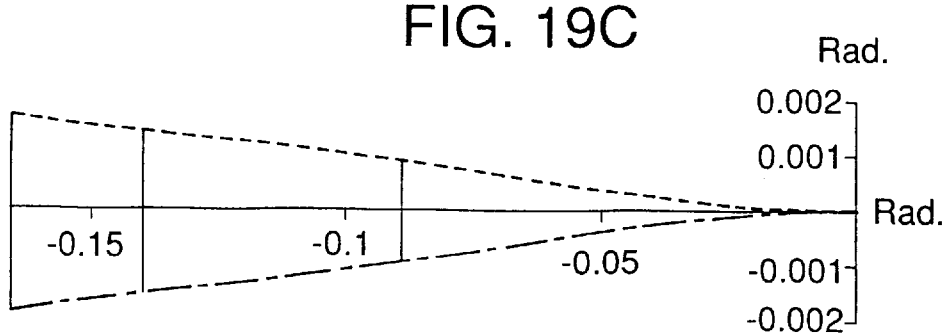

FIGS. 16A to 16C show the aberration observed at the wide-angle end of the fifth embodiment; FIGS. 17A to 17C show the aberration observed at the telephoto end of the fifth embodiment. FIGS. 18A to 18C show the aberration observed at the wide-angle end of the sixth embodiment; FIGS. 19A to 19C show the aberration observed at the telephoto end of the sixth embodiment. Of these aberration diagrams, FIGS. 16A, 17A, 18A, and 19A show astigmatism, FIGS. 16B, 17B, 18B, and 19B show distortion, and FIGS. 16C, 17C, 18C, and 19C show lateral chromatic aberration. In all of these aberration diagrams, it is assumed that the object distance is 3 m. In these aberration diagrams, aberration for light of different wavelengths (design wavelengths: e-lines, c-lines, and g-lines) is plotted with different types of line. Specifically, if FIG. 16A is taken as an example, the solid line 11 represents tangential aberration for e-lines, the short-dash line 12 represents sagittal aberration for e-lines, the dash-dot line 13 represents tangential aberration for c-lines, the long-dash line 14 represents sagittal aberration for c-lines, the dotted line 15 represents tangential aberration for g-lines, and the dash-dot-dot line 16 represents sagittal aberration for g-lines. Note that this distinction between the types of lines for light of different wavelengths is used also in similar aberration diagrams presented here and later, that is, in FIGS. 17A to 17C, 18A to 18C, and 19A to 19C. For astigmatism, the dioptric power (in diopters) is taken along the vertical axis; for distortion, the percentage of distortion is taken along the vertical axis; for lateral chromatic aberration, the angle with respect to the optical axis (in radians) is taken along the vertical axis. In all of these aberration diagrams, the angle of incidence (in radians) on the pupil plane is taken along the horizontal axis.

For the fifth and sixth embodiments, as seen from their construction data, the aberration occurring on the diffracting optical surfaces is evaluated by the use of the Sweatt model. The Sweatt model refers to a method of performing optical calculations on diffracting optical surfaces in a simplified way. According to the Sweatt model, calculations on diffracting optical surfaces can be performed in a similar way as ordinary calculations in geometrical optics, simply by using an extremely large index of refraction in relation to a given wavelength. Here, each type of aberration is calculated on the assumption that the index of refraction for e-lines is 10001.00000.

In both of the fifth and sixth embodiments, the objective lens tg is constituted of a first lens unit g1 having negative power, a second lens unit g2 having positive power, and a third lens unit g3 having positive power. Zooming is performed by moving the first and second lens units g1 and g2 as indicated by arrows m1 and m2, respectively. The third lens unit g3 is formed as one unit together with a prism having a reversing function. The condenser lens co is formed as one unit together with a reversing prism p on the entrance surface thereof. Behind the reversing prism p, the eyepiece lens se composed of a single lens is disposed.

In the fifth embodiment, diffracting optical surfaces are provided on the pupil he side surface of the second lens unit g2, which has the longer distance to move, and on the pupil he side surface of the eyepiece lens se. In the sixth embodiment, diffracting optical surfaces are provided on the pupil he side surface of the first lens unit g1 and on the pupil he side surface of the eyepiece lens se. By providing a diffracting optical surface both in the objective lens tg and in the eyepiece lens se, it is possible to correct the chromatic aberration occurring in each of the lenses tg and se by the use of the diffracting optical surface provided in each lens. As a result, as seen from the aberration diagrams in FIGS. 16A to 16C, 17A to 17C, 18A to 18C, and 19A to 19C, well-balanced correction of both axial chromatic aberration and lateral chromatic aberration can be achieved both at the wide-angle end and at the telephoto end. It is to be noted that the diffracting optical surfaces may be provided on either of the object side or pupil he side surface of the lenses, though they are provided on the pupil he side surface of the lenses in the fifth and sixth embodiments.

As described above, according to the present invention, since a diffracting optical surface is provided both in the objective lens and in the eyepiece lens, it is possible to realize a viewfinder optical system that achieves proper correction of chromatic aberration with a reduced number of lens elements. That is, since the chromatic aberration occurring in each of the lenses is individually corrected properly by the diffracting optical surface provided in each lens, it is possible to reduce the number of lens elements as compared with conventional viewfinder optical systems, and thus it is possible to reduce the weight, size, and cost of a viewfinder optical system.

Moreover, depending on the way that the present invention is implemented, it is also possible to reduce the number of lens elements and simplify the construction of the viewfinder optical system if the eyepiece lens is composed of a positive single lens, to correct chromatic aberration properly over the entire zoom range if a diffracting optical surface is provided in the lens unit that is moved to achieve zooming, and to achieve well-balanced correction of chromatic aberration in the objective lens and in the eyepiece lens if above-noted condition (3) is satisfied.

FIGS. 20A to 20D are enlarged cross-sectional views of examples of diffracting optical surfaces as used in the embodiments of the present invention. In the example in FIG. 20A, a diffracting optical surface is composed by forming a resin layer 2 having a saw-toothed cross section on a glass substrate 1 having a predetermined curvature. In the example in FIG. 20B, which is a modified type of the example in FIG. 20A, a diffracting optical surface is composed by forming a resin layer 2' having a step-like cross section on a glass substrate 1 having a predetermined curvature. Of course, the pitch of the pattern formed by these resin layers is determined in accordance with the optical power of diffraction required on those surfaces.

Figure 20A:
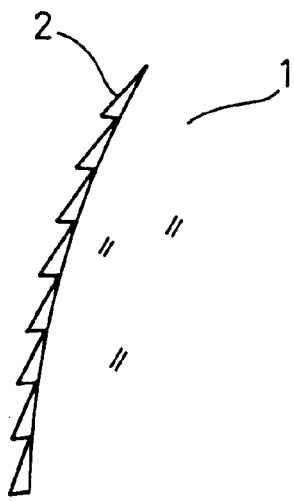
FIGS. 20A to 20D are enlarged cross-sectional views of examples of diffracting optical surfaces as used in the embodiments of the present invention.
Figure 20B:
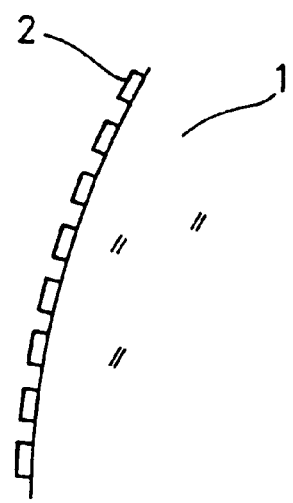

In the examples in FIGS. 20A and 20B, there exists a border surface between the resin layer 2 or 2' and the glass substrate 1. However, by making the index of refraction of the resin layer 2 or 2' substantially the same as that of the glass substrate 1, the existence of the border surface can be ignored from the optical viewpoint. Even then, although the border surface between the resin layer 2 or 2' and the glass substrate 1 is optically non-existent, a light ray incident on this optically functioning surface is affected both by the optical power of diffraction resulting from the saw-toothed shape of the resin layer and by the optical power of refraction resulting from the curvature that the surface as a whole has. Accordingly, even if this optically functioning surface has only one surface physically, this surface is regarded, from the optical viewpoint, as having optical power of both diffraction and refraction.

In the diffracting optical surfaces in FIGS. 20A and 20B, the resin layer 2 or 2' can be produced by first applying optical resin to the surface of the glass substrate 1, and then either molding it with a mold prepared beforehand or cutting the optical resin layer directly with a laser beam or the like.

Figure 20C:
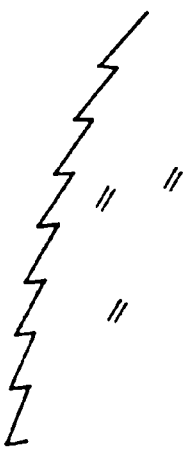
Figure 20D:
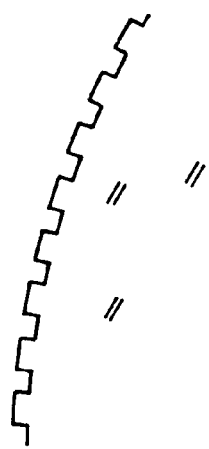

FIGS. 20C and 20D show further examples of diffracting optical surfaces, corresponding to the examples in FIGS. 20A and 20B, respectively. In the examples in FIGS. 20C and 20D, the saw-toothed or step-like portion that exerts optical power of diffraction and the portion corresponding to the glass substrate of the first two examples are formed as one seamless optical element offering an optically functioning surface.

The examples in FIGS. 20C and 20D, unlike those in FIGS. 20A and 20B, do not have any smooth surface as is found in normal lenses exerting optical power of refraction. However, also here, even if this optically functioning surface has only one surface physically, this surface is regarded, from the optical viewpoint, as having optical power of both diffraction and refraction.

The diffracting optical surfaces in FIGS. 20A and 20B can be produced, for example, by molding resin or the like with a mold prepared beforehand.

TABLE 1

| | h1 | h2 | h3 | h1Σ | h2Σ | h3Σ |
|---|---|---|---|---|---|---|
| Sign | Positive | 0 | Negative | Positive | Positive | 0 |

<< Embodiment 1 >>

| Surface | Radius of Curvature | Axial Distance | Index of Refraction | Abbe Number | |
|---|---|---|---|---|---|
| S0 | r0 = ∞ | | | (Focal Plane) | |
| | | d0 = 57.072 | | | |
| S1*[DOE] | r1 = ∞ | | | | |
| | | d1 = 5.903 | N1 = 1.4914 | v1 = 57.82 | . . . G1 |
| S2* | r2 = −9.015 | | | | |
| | | d2 = 27.742 | | | |
| S3* | r3 = 34.892 | | | | |
| | | d3 = 4.250 | N2 = 1.4914 | v2 = 57.82 | . . . G2 |
| S4 | r4 = −21.485 | | | | |
| | | d4 = 16.000 | | | |
| S5*[DOE] | r5 = 169.332 | | | | |
| | | d5 = 4.000 | N3 = 1.4914 | v3 = 57.82 | . . . G3 |
| S6 | r6 = −15.655 | | | | |
| | | d6 = 17.000 | | | |
| S7 | r7 = ∞ | | | (Pupil E) | |

-continued

<Aspherical Coefficients>

| [Surface] | [K] | [A4] | [A6] | [A8] | [A10] |
|---|---|---|---|---|---|
| S1 | 0.00 | $-2.68 \times 10^{-4}$ | $-8.88 \times 10^{-6}$ | $1.02 \times 10^{-7}$ | $-8.32 \times 10^{-9}$ |
| S2 | $1.75 \times 10^{-1}$ | $6.18 \times 10^{-6}$ | $-1.93 \times 10^{-7}$ | $-4.16 \times 10^{-8}$ | $-3.28 \times 10^{-10}$ |
| S3 | $1.51 \times 10^{-1}$ | $-2.50 \times 10^{-5}$ | $-4.52 \times 10^{-7}$ | $1.00 \times 10^{-9}$ | 0.00 |
| S5 | $-9.53 \times 10^{3}$ | $-6.21 \times 10^{-5}$ | $-1.48 \times 10^{-7}$ | $7.42 \times 10^{-9}$ | $-6.31 \times 10^{-11}$ |

<Phase Function Coefficients of Diffracting Optical Surfaces>

| [Surface] | [C1] | [C2] | [C3] | [C4] |
|---|---|---|---|---|
| S1 | $-2.18 \times 10^{-3}$ | $1.36 \times 10^{-6}$ | $4.72 \times 10^{-7}$ | $-3.30 \times 10^{-8}$ |
| S5 | $-1.10 \times 10^{-3}$ | $-1.68 \times 10^{-5}$ | $3.76 \times 10^{-7}$ | $-2.20 \times 10^{-9}$ |

<< Embodiment 2 >>

| Surface | Radius of Curvature | Axial Distance | Index of Refraction | Abbe Number | |
|---|---|---|---|---|---|
| S0 | $r0 = \infty$ | | | (Focal Plane) | |
| | | $d0 = 51.177$ | | | |
| S1* | $r1 = \infty$ | | | | |
| | | $d1 = 7.000$ | $N1 = 1.4914$ | $v1 = 57.82$ | ... G1 |
| S2*[DOE] | $r2 = -7.929$ | | | | |
| | | $d2 = 26.629$ | | | |
| S3*[DOE] | $r3 = -91.927$ | | | | |
| | | $d3 = 4.000$ | $N2 = 1.4914$ | $v2 = 57.82$ | ... G2 |
| S4 | $r4 = -17.477$ | | | | |
| | | $d4 = 10.852$ | | | |
| S5 | $r5 = 33.759$ | | | | |
| | | $d5 = 3.800$ | $N3 = 1.4914$ | $v3 = 57.82$ | ... G3 |
| S6* | $r6 = -19.640$ | | | | |
| | | $d6 = 18.000$ | | | |
| S7 | $r7 = \infty$ | | | (Pupil E) | |

<Aspherical Coefficients>

| [Surface] | [K] | [A4] | [A6] | [A8] | [A10] |
|---|---|---|---|---|---|
| S1 | 0.00 | $-6.76 \times 10^{-4}$ | $8.40 \times 10^{-7}$ | $-5.00 \times 10^{-7}$ | $-2.51 \times 10^{-8}$ |
| S2 | $7.70 \times 10^{-2}$ | $-9.94 \times 10^{-7}$ | $-1.09 \times 10^{-6}$ | $-3.12 \times 10^{-8}$ | $-8.72 \times 10^{-10}$ |
| S3 | $-5.54 \times 10$ | $3.56 \times 10^{-5}$ | $4.84 \times 10^{-7}$ | $-2.35 \times 10^{-8}$ | $1.72 \times 10^{-10}$ |
| S6 | $-2.28 \times 10$ | $6.07 \times 10^{-6}$ | $-2.21 \times 10^{-7}$ | $7.16 \times 10^{-10}$ | 0.00 |

<Phase Function Coefficients of Diffracting Optical Surfaces>

| [Surface] | [C1] | [C2] | [C3] | [C4] |
|---|---|---|---|---|
| S2 | $-2.64 \times 10^{-3}$ | $5.59 \times 10^{-6}$ | $2.21 \times 10^{-7}$ | 0.00 |
| S3 | $-4.46 \times 10^{-3}$ | 0.00 | 0.00 | 0.00 |

<< Embodiment 3 >>

| Surface | Radius of Curvature | Axial Distance | Index of Refraction | Abbe Number | |
|---|---|---|---|---|---|
| S0 | $r0 = \infty$ | | | (Focal Plane) | |
| | | $d0 = 38.816$ | | | |
| S1* | $r1 = -16.496$ | | | | |
| | | $d1 = 3.000$ | $N1 = 1.4914$ | $v1 = 57.82$ | ... G1 |
| S2 | $r2 = -27.623$ | | | | |
| | | $d2 = 3.321$ | | | |
| S3* | $r3 = 17.074$ | | | | |
| | | $d3 = 5.500$ | $N2 = 1.4914$ | $v2 = 57.82$ | ... G2 |
| S4*[DOE] | $r4 = -9.476$ | | | | |

-continued

| | | d4 = 33.946 | | |
|---|---|---|---|---|
| S5* | r5 = 22.538 | | | |
| | | d5 = 5.500 | N3 = 1.4914 | v3 = 57.82 . . . G3 |
| S6*[DOE] | r6 = −16.262 | | | |
| | | d6 = 18.000 | | |
| S7 | r7 = ∞ | | | (Pupil E) |

<Aspherical Coefficients>

| [Surface] | [K] | [A4] | [A6] | [A8] | [A10] |
|---|---|---|---|---|---|
| S1 | 2.98 | −9.52 × 10⁻¹ | −2.13 × 10⁻⁵ | 2.12 × 10⁻⁶ | −1.57 × 10⁻⁷ |
| S3 | −1.13 × 10 | −1.51 × 10⁻⁵ | −5.70 × 10⁻⁷ | −1.60 × 10⁻⁸ | 1.29 × 10⁻¹⁰ |
| S4 | −1.45 × 10⁻¹ | 4.42 × 10⁻⁵ | 6.83 × 10⁻⁷ | 1.10 × 10⁻⁹ | −9.39 × 10⁻¹¹ |
| S5 | −6.54 | −1.17 × 10⁻⁵ | −4.89 × 10⁻⁷ | −8.88 × 10⁻⁹ | −1.62 × 10⁻¹⁰ |
| S6 | 5.98 × 10⁻² | −2.42 × 10⁻⁶ | −1.14 × 10⁻⁷ | −4.00 × 10⁻⁹ | 4.28 × 10⁻¹³ |

<Phase Function Coefficients of Diffracting Optical Surfaces>

| [Surface] | [C1] | [C2] | [C3] | [C4] |
|---|---|---|---|---|
| S4 | −2.28 × 10⁻³ | 3.52 × 10⁻⁷ | −7.86 × 10⁻⁸ | −2.98 × 10⁻⁹ |
| S6 | −1.65 × 10⁻³ | 8.18 × 10⁻⁶ | 3.90 × 10⁻⁸ | −6.73 × 10⁻⁹ |

<< Embodiment 4 >>

| Surface | Radius of Curvature | Axial Distance | Index of Refraction | Abbe Number |
|---|---|---|---|---|
| S0 | r0 = ∞ | | | (Focal Plane) |
| | | d0 = 56.723 | | |
| S1*[DOE] | r1 = −118.605 | | | |
| | | d1 = 5.969 | N1 = 1.5251 | v1 = 56.38 . . . G1 |
| S2* | r2 = −9.011 | | | |
| | | d2 = 28.058 | | |
| S3* | r3 = 34.892 | | | |
| | | d3 = 4.250 | N2 = 1.4914 | v2 = 57.82 . . . G2 |
| S4 | r4 = −21.485 | | | |
| | | d4 = 16.000 | | |
| S5*[DOE] | r5 = 193.963 | | | |
| | | d5 = 4.000 | N3 = 1.4914 | v3 = 57.82 . . . G3 |
| S6 | r6 = −15.514 | | | |
| | | d6 = 17.000 | | |
| S7 | r7 = ∞ | | | (Pupil E) |

<Aspherical Coefficients>

| [Surface] | [K] | [A4] | [A6] | [A8] | [A10] |
|---|---|---|---|---|---|
| S1 | −9.69 × 10² | −3.17 × 10⁻⁶ | −1.08 × 10⁻⁵ | 2.18 × 10⁻⁷ | −1.13 × 10⁻⁸ |
| S2 | 1.52 × 10⁻¹ | 4.12 × 10⁻⁶ | −4.46 × 10⁻⁷ | −4.71 × 10⁻⁸ | 8.59 × 10⁻¹¹ |
| S3 | 1.51 × 10⁻¹ | −2.50 × 10⁻⁵ | −4.52 × 10⁻⁷ | 1.00 × 10⁻⁹ | 0.00 |
| S5 | −1.55 × 10⁴ | −6.28 × 10⁻⁵ | −2.37 × 10⁻⁷ | 8.44 × 10⁻⁹ | −6.68 × 10⁻¹¹ |

<Phase Function Coefficients of Diffracting Optical Surfaces>

| [Surface] | [C1] | [C2] | [C3] | [C4] |
|---|---|---|---|---|
| S1 | −2.32 × 10⁻³ | −1.94 × 10⁻⁷ | 1.12 × 10⁻⁶ | −7.72 × 10⁻⁸ |
| S5 | −1.05 × 10⁻³ | −1.89 × 10⁻⁵ | 4.31 × 10⁻⁷ | −2.67 × 10⁻⁹ |

| | Emb. 1 | Emb. 2 | Emb. 3 | Emb. 4 |
|---|---|---|---|---|
| φRd | 0.00436 | 0.00528 | 0.00456 | 0.00464 |
| φRt | 0.0581 | 0.0675 | 0.0785 | 0.0582 |
| φEd | 0.0022 | — | 0.00331 | 0.0021 |
| φEt | 0.0469 | — | 0.0528 | 0.0468 |
| φCd | — | 0.00893 | — | — |
| φCt | — | 0.0547 | — | — |

-continued

| | Emb. 1 | Emb. 2 | Emb. 3 | Emb. 4 |
|---|---|---|---|---|
| \|(φRd/φRt)−(φEd/φEt)\| | 0.028 | — | 0.0045 | 0.035 |
| \|(φRd/φRt)−(φCd/φCt)\| | — | 0.085 | — | — |

| << Embodiment 5 >> $\beta = 0.44 \sim 1.0$ ||||| 
|---|---|---|---|---|
| Surface | Radius of Curvature | Axial Distance | Index of Refraction | Abbe Number |
| S1* | r1 = −12.218 | | | |
| | | d1 = 1.000 | N1 = 1.49329 | ν1 = 57.82 . . . g1 |
| S2* | r2 = 22.796 | | | |
| | | d2 = 12.12 ~ 1.92 | | |
| S3* | r3 = 9.953 | | | |
| | | d3 = 2.800 | N2 = 1.49329 | ν2 = 57.82 . . . g2 |
| S4 | r4 = −12.11460 | | | |
| | | d4 = 0.000 | N3 = 10001.00000 | ν3 = −3.45 |
| S5[DOE] | r5 = −12.1145474 | | | |
| | | d5 = 0.78 ~ 9.34 | | |
| S6 | r6 = 40.000 | | | |
| | | d6 = 16.000 | N4 = 1.58752 | ν4 = 30.36 . . . g3 |
| S7 | r7 = ∞ | | | |
| | | d7 = 3.000 | | |
| S8 | r8 = 17.489 | | | |
| | | d8 = 12.300 | N5 = 1.58752 | ν5 = 30.36 . . . p |
| S9 | r9 = ∞ | | | |
| | | d9 = 8.980 | | |
| S10* | r10 = 19.205 | | | |
| | | d10 = 3.000 | N6 = 1.49329 | ν6 = 57.82 . . . se |
| S11 | r11 = −16.94522 | | | |
| | | d11 = 0.000 | N7 = 10001.00000 | ν7 = −3.45 |
| S12[DOE] | r12 = −16.9451069 | | | |

<Aspherical Coefficients>

S1 : $\epsilon = 1.00$, $A4 = -6.23 \times 10^{-4}$, $A6 = -2.04 \times 10^{-6}$
S2 : $\epsilon = 1.00$, $A4 = -7.00 \times 10^{-4}$, $A6 = 2.80 \times 10^{-6}$
S3 : $\epsilon = 1.00$, $A4 = -5.13 \times 10^{-4}$, $A6 = 1.00 \times 10^{-6}$
S10: $\epsilon = 1.00$, $A4 = -1.05 \times 10^{-4}$, $A6 = 2.00 \times 10^{-7}$ <Value Corresponding to Condition (3) and Related Values>

$\phi O = 0.09$, $\phi OD = 0.0038$, $\phi E = 0.0548$, $\phi ED = 0.0015$,
$|\phi OD \cdot \phi E/(\phi O \cdot ED)| = 1.56$

| << Embodiment 6 >> $\beta = 0.41 \sim 0.93$ ||||| 
|---|---|---|---|---|
| Surface | Radius of Curvature | Axial Distance | Index of Refraction | Abbe Number |
| S1* | r1 = −28.382 | | | |
| | | d1 = 1.000 | N1 = 1.58752 | ν1 = 30.36 . . . g1 |
| S2* | r2 = 15.12500 | | | |
| | | d2 = 0.000 | N2 = 10001.00000 | ν2 = −3.45 |
| S3[DOE]* | r3 = 15.1249540 | | | |
| | | d3 = 12.12 ~ 1.87 | | |
| S4* | r4 = 10.815 | | | |
| | | d4 = 2.800 | N3 = 1.49329 | ν3 = 57.82 . . . g2 |
| S5 | r5 = −10.141 | | | |
| | | d5 = 0.78 ~ 9.34 | | |
| S6 | r6 = 40.000 | | | |
| | | d6 = 16.000 | N4 = 1.58752 | ν4 = 30.35 . . . g3 |
| S7 | r7 = ∞ | | | |
| | | d7 = 3.000 | | |
| S8 | r8 = 17.489 | | | |
| | | d8 = 20.000 | N5 = 1.58752 | ν5 = 30.36 . . . p |
| S9 | r9 = ∞ | | | |
| | | d9 = 4.930 | | |
| S10* | r10 = 19.205 | | | |
| | | d10 = 3.000 | N6 = 1.49329 | ν6 = 57.82 . . . se |
| S11 | r11 = 21.24076 | | | |
| | | d11 = 0.000 | N7 = 10001.00000 | ν7 = −3.45 |
| S12[DOE] | r12 = −21.2406234 | | | |

<Aspherical Coefficients>

-continued

S1 : $\epsilon = 1.00, A4 = -6.23 \times 10^{-4}, A6 = -2.04 \times 10^{-6}$
S2 : $\epsilon = 1.00, A4 = -7.00 \times 10^{-4}, A6 = 2.80 \times 10^{-6}$
S3 : $\epsilon = 1.00, A4 = -7.00 \times 10^{-4}, A6 = 2.80 \times 10^{-6}$
S4 : $\epsilon = 1.00, A4 = -5.13 \times 10^{-4}, A6 = 1.00 \times 10^{-6}$
S10: $\epsilon = 1.00, A4 = -1.05 \times 10^{-4}, A6 = 2.00 \times 10^{-7}$ <Value Corresponding to Condition (3) and Related Values>

$\phi O = -0.0621, \phi OD = 0.002, \phi E = 0.0505, \phi ED = 0.003,$
$|\phi OD \cdot \phi E/(\phi O \cdot \phi ED)| = 0.54$

What is claimed is:

1. A viewfinder optical system comprising:
   a relay lens system for refocusing a primary image as a secondary image and including at least one surface having optical power of diffraction; and
   an eyepiece optical system for magnifying the secondary image and including at least one surface having optical power of diffraction.

2. A viewfinder optical system as claimed in claim 1, wherein said relay lens system comprises a single lens element having positive optical power.

3. A viewfinder optical system as claimed in claim 1, wherein the entire viewfinder optical system comprises three lenses.

4. A viewfinder optical system as claimed in claim 1, wherein the optical power of diffraction of the surface included in said relay lens system is positive and the optical power of refraction of the surface included in said eyepiece optical system is positive, and wherein the following condition is fulfilled:

$$\left|\frac{\phi Rd}{\phi Rt} - \frac{\phi Ed}{\phi Et}\right| < 0.1$$

where $\phi Rd$ represents the optical power of diffraction of the surface included in said relay lens system, $\phi Rt$ represents the composite optical power of diffraction and refraction of the surfaces included in the relay lens system, $\phi Ed$ represents the optical power of diffraction of the surface included in said eyepiece optical system, $\phi Et$ represents the composite optical power of diffraction and refraction of the surfaces included in the eyepiece optical system.

5. A viewfinder optical system as claimed in claim 1, further comprising:
   a condenser lens system provided between the relay lens system and the eyepiece optical system.

6. A viewfinder optical system as claimed in claim 5, wherein the optical power of diffraction of the surface included in said relay lens system is positive and the optical power of refraction of the surface included in said condenser lens system is positive, and wherein the following condition is fulfilled:

$$\left|\frac{\phi Rd}{\phi Rt} - \frac{\phi Cd}{\phi Ct}\right| < 0.1$$

where $\phi Rd$ represents the optical power of diffraction of the surface included in said relay lens system, $\phi Rt$ represents the composite optical power of diffraction and refraction of the surfaces included in the relay lens system, $\phi Cd$ represents the optical power of diffraction of the surface included in said condenser lens system, $\phi Ct$ represents the composite optical power of diffraction and refraction of the surfaces included in the condenser lens system.

7. A viewfinder optical system as claimed in claim 1, wherein the condenser lens includes at least one surface having optical power of diffraction.

8. A viewfinder optical system as claimed in claim 1, wherein the relay lens system includes at least one aspherical surface.

9. A viewfinder optical system as claimed in claim 1, wherein the relay lens system includes at least one surface having optical power of both refraction and diffraction.

10. A viewfinder optical system as claimed in claim 9, wherein the optical power of refraction of said surface is equivalent to that of an aspherical surface.

11. A viewfinder optical system as claimed in claim 1, wherein the eyepiece optical system includes at least one surface having optical power of both refraction and diffraction.

12. A viewfinder optical system as claimed in claim 11, wherein optical power of refraction of said surface is equivalent to that of an aspherical surface.

13. A viewfinder optical system as claimed in claim 5, wherein the condenser lens system includes at least one surface having optical power of both refraction and diffraction.

14. A viewfinder optical system as claimed in claim 13, wherein the optical power of refraction of said surface is equivalent to that of an aspherical surface.

15. A viewfinder optical system including at least two surfaces having optical power of both diffraction and refraction, wherein the optical power of refraction of said surfaces is equivalent to that of an aspherical surface.

16. A Kepler-type viewfinder optical system comprising:
    an objective lens system for focusing rays from an object as an intermediate image and including at least one surface having optical power of diffraction; and
    an eyepiece optical system for magnifying the intermediate image and including at least one surface having optical power of diffraction.

17. A Kepler-type viewfinder optical system as claimed in claim 16, wherein said eyepiece optical system comprises a single lens element.

18. A Kepler-type viewfinder optical system as claimed in claim 16, wherein said objective lens system is a zoom lens system.

19. A Kepler-type viewfinder optical system as claimed in claim 16, wherein the objective lens system comprises a plurality of lens units, and wherein the diffractive optical surface included in said objective lens system is provided in a lens unit moved along an optical axis so as to perform the zooming.

20. A Kepler-type viewfinder optical system as claimed in claim 16, wherein the objective lens includes, from an object side, a first lens unit having negative optical power and a second lens unit having positive refractive power, and wherein one of the surfaces having the optical power of diffraction is included in either the first or the second lens unit.

21. A Kepler-type viewfinder optical system as claimed in claim 16, wherein the following condition is fulfilled:

$$0.1 < \left| \frac{\phi OD \cdot \phi E}{\phi O \cdot \phi ED} \right| < 2.0$$

where

φOD represents the optical power of diffraction of the surface included in said objective lens system, φO represents the composite optical power of diffraction and refraction of the surfaces included in the objective lens system, φED represents the optical power of diffraction of the surface included in said eyepiece optical system, φE represents the composite optical power of diffraction and refraction of the surfaces included in the eyepiece optical system.

22. A Kepler-type viewfinder optical system as claimed in claim 16, wherein the eyepiece optical system includes at least one surface having optical power of both refraction and diffraction.

23. A Kepler-type viewfinder optical system as claimed in claim 16, wherein the objective lens system includes at least one surface having an optical function of both refraction and diffraction.

24. A Kepler-type viewfinder optical system as claimed in claim 23, wherein the optical power of refraction of said surface is equivalent to that of an aspherical surface.

25. A viewfinder optical system comprising a plurality of lenses whose material is plastic, wherein at least one of said lenses includes at least one surface having optical power of diffraction and said viewfinder optical system is a real image-type optical system.

26. A viewfinder optical system as claimed in claim 25, wherein each of said lenses has positive optical power.

27. A viewfinder optical system as claimed in claim 25, wherein said surface having optical power of diffraction has positive optical power.

28. A viewfinder optical system as claimed in claim 25, wherein at least one of said lenses is made of polymethyl methacrylate.

29. A viewfinder optical system as claimed in claim 25, wherein at least one of said lenses is made of amorphous polyolefin.

30. A viewfinder optical system as claimed in claim 25, wherein all lenses included therein fulfill the following condition:

$$vd > 50$$

where vd represents Abbe number of a material of each of the lenses.

31. A viewfinder optical system comprising:

a relay lens system for refocusing a primary image as a secondary image; and an eyepiece optical system for magnifying said secondary image, wherein all of the lenses in said relay lens system and said eyepiece optical system are made of plastic, wherein at least one of said lenses includes at least one surface having an optical power of diffraction, and wherein said viewfinder optical system is a real image-type optical system.

* * * * *